United States Patent [19]

Li et al.

[11] Patent Number: 5,428,737
[45] Date of Patent: Jun. 27, 1995

[54] COMPREHENSIVE BILATERAL TRANSLATION BETWEEN SQL AND GRAPHICALLY DEPICTED QUERIES

[75] Inventors: Shih-Gong Li, Austin; Charles K. Bucher, Round Rock; Kenneth R. Banning, Austin, all of Tex.

[73] Assignee: International Business Machines Corporation, Armonk, N.Y.

[21] Appl. No.: 778,048

[22] Filed: Oct. 16, 1991

[51] Int. Cl.⁶ ........................ G06F 3/153; G06F 17/30
[52] U.S. Cl. ..................................... 395/161; 395/600
[58] Field of Search ................ 395/500, 600, 157–161; 364/DIG. 1 MS File

[56] References Cited

U.S. PATENT DOCUMENTS 4,723,211  2/1988  Barker et al. .................. 364/DIG. 1
5,175,814  12/1992  Anick et al. ......................... 395/161

OTHER PUBLICATIONS

Database Manager Structured Query Language (SQL) Concepts IBM Copyright 1988, 1990.
Graphical User Languages For Querying Information: Where To Look For Criteria?, Gabriele Rohr, 1988 IEEE, pp. 21–28.
Design and Implementation of an Interactive Graphical Query Interface for a Relational Database, Bogdan Czejdo, Venugopal Reddy, Marek Rusinkiewicz, 1988 IEEE, pp. 14–20.
End–User Access to Relational Databases Metaphor Database Server, Art Benjamin and David Rossetti, 1987.
Engineering with Computers, User Interfaces for Structural Engineering Relational Data Base, H. Craig Howard and Cynthia Stotts Howard, 1988.

*Primary Examiner*—Thomas M. Heckler
*Attorney, Agent, or Firm*—Casimer K. Salys

[57] ABSTRACT

A method, system and program providing comprehensive bilateral translation between text format and visual format relational database queries. In a preferred form, tables and lists are configured to define a common data structure. Translation between structured query language (SQL) query statements and the common data structure is accomplished by clause. Similarly, a common data structure for the visual or graphical format queries is defined, preferably employing graphics symbols and multiple windows. Bidirectional translation is thereafter accomplished through the common data structure. The method, system and program is comprehensive in the SQL clauses available, together with providing full resources for hierarchical subselect clauses.

14 Claims, 41 Drawing Sheets

FIG. 3

FromTable:

| Staff |
|---|
| ORG |

SelectColumn:

| Staff . DEPT |
|---|
| ORG . MANAGER |

SelectExp:

| SUM (Staff . SALARY) |
|---|
| AVERAGE (Staff . SALARY) |
| MIN (Staff . SALARY) |
| MAX (Staff . SALARY) |

WhereCond ( a Boolean expression ) :

(A . DEPT = B . DEPT) AND ((( YEAR > 25 ) AND ( SALARY > 60000 )) OR (( JOB = 45 ) AND ( DEPT = A11 )))

GroupBy:

| Staff . DEPT |
|---|
| ORG . MANAGER |

HavingCond ( a Boolean expression ) :

((( MAX ( SALARY ) < 100000) AND ( MIN ( SALARY ) > 40000 ) AND (DEPT IN best ))

OrderBy

| Staff . DEPT | ASC |
|---|---|

DistinctFlag

| off |
|---|

W_Join List

| LeftSide | RightSide |
|---|---|
| Staff.DEPT | ORG.DEPT |

W_Parent Children

| ParentNode | ChildrenNodes |
|---|---|
| N1 | (N2, N3) |
| N2 | (N4, N5) |
| N3 | (N6, N7) |

Column List (Staff)

| ColumnName | Flag |
|---|---|
| DEPT | ON |
| SALARY | OFF |
| YEAR | OFF |
| JOB | OFF |

Column List (ORG)

| ColumnName | Flag |
|---|---|
| DEPT | OFF |
| MANAGER | ON |

W_Node Loc Type

| NodeName | Coordinates | Type |
|---|---|---|
| N1 | (1, 2) | OR |
| N2 | (2, 3) | AND |
| N3 | (2, 1) | AND |
| N4 | (3, 3) | Pred |
| N5 | (3, 2.5) | Pred |
| N6 | (3, 1.5) | Pred |
| N7 | (3, 1) | Pred |

W_Predicate Data

| NodeName | LeftSide | CompOp | ValueButton | RS_Value | SubqueryButton | RS_Subquery |
|---|---|---|---|---|---|---|
| N4 | Staff.YEAR | > | ON | 25 | OFF | Null |
| N5 | Staff.SALARY | > | ON | 60000 | OFF | Null |
| N6 | Staff.JOB | = | ON | 45 | OFF | Null |
| N7 | ORG.DEPT | = | ON | All | OFF | Null |

FIG. 4

H_ParentChildren

| ParentNode | ChildrenNodes |
|---|---|
| N1 | ( N2, N3, N4 ) |

H_NodeLoc Type

| Node Name | Coordinates | Type |
|---|---|---|
| N1 | (1, 2) | AND |
| N2 | (2, 3.5) | Pred |
| N3 | (2, 2.5) | Pred |
| N4 | (2, 1) | Pred |

W_Predicate Data

| NodeName | LeftSide | Comp Op | Value Button | RS_Value | Subquery Button | RS_Subquery |
|---|---|---|---|---|---|---|
| N2 | MAX(Staff.SALARY) | < | ON | 100000 | OFF | Null |
| N3 | MIN(Staff.SALARY) | > | ON | 40000 | OFF | Null |
| N4 | ORG.DEPT | IN | OFF | Null | ON | best |

FIG. 5

GroupList

| ColumnName | GroupCheck |
|---|---|
| Staff . DEPT | on |
| Staff . SALARY | off |
| Staff . YEAR | off |
| Staff . JOB | off |
| ORG . DEPT | off |
| ORG . MANAGER | on |

OrderList

| ColumnName | OrderOp | OrderNumber |
|---|---|---|
| Staff . DEPT | ASC | 1 |
| Staff . SALARY | Null | Null |
| Staff . YEAR | Null | Null |
| Staff . JOB | Null | Null |
| ORG . DEPT | Null | Null |
| ORG . MANAGER | Null | Null |

FIG. 6

S_ParentChildren

| ParentNode | ChildrenNodes |
|---|---|
| Null | Null |
| Null | Null |
| Null | Null |

S_NodeLocType

| NodeName | Coordinates | Type |
|---|---|---|
| Null | Null | Null |
| Null | Null | Null |
| Null | Null | Null |

S_NodeQuery

| NodeName | QueryName |
|---|---|
| Null | Null |
| Null | Null |
| Null | Null |

EMPTY LISTS - NO SET OPERATION USED IN EXAMPLE

FIG. 7

COMPREHENSIVE BILATERAL TRANSLATION BETWEEN SQL AND GRAPHICALLY DEPICTED QUERIES

CROSS REFERENCE TO RELATED APPLICATIONS

Subject matter in the present application is related to the invention in U.S. patent application Ser. No. 07/628,543 filed Dec. 17, 1990 under the title "Tree Structure Representation Of An SQL Clause".

BACKGROUND OF THE INVENTION

The present invention relates generally to an interface between a human user and a computerized relational database. More particularly, the invention is directed to methods, systems and programs for comprehensively and bilaterally translating between structured query language (SQL) statements and graphically depicted queries as may be used to search a computer implemented relational database.

Relational form databases have become the subject of significant recent interest, not only because of the increasing volume of data being stored and retrieved by computerized databases but also by virtue of the data relationships which can be established during the storage and retrieval processes.

Structured query language (SQL), and in particular the ANSI SQL, has become the preferred language media for communicating queries to relational databases. As a consequence, there presently exist thousands of relational databases and thousands of related queries directed to such databases. Given the investment in such databases and queries, migration is not only a desirable feature, but a substantially necessary capability for new relational database systems and methods.

The concept of portraying a query in a visual depiction on the screen of a workstation is a relatively new approach to relational database interfacing. Visual queries, often referred to as graphical queries, utilize workstation graphics to represent the query objectives heretofore defined by SQL statements. The visual query presents in a pictorial depiction the objectives of the search, thereby eliminating the need for the user to learn SQL, improving the rate at which SQL queries can be formulated, and reducing the defect or error rate of queries. It is well recognized that SQL, though computationally efficient, is a difficult language for users to master and apply.

With the growing prevalence of relational databases, communication networks and workstations, the training and experience of a representative system user has decreased in relation to the resources available. The dilemma created by these various events is threefold. First, there exists an established and valuable base of queries formulated with classical SQL expressions. Second, there is a growing usage of relational databases and networks accessing their information. Finally, the end users of such databases are routinely less proficient in the very tools needed to efficiently and accurately access the relational database information. Thus, a distinct need exists for methods, systems and programs which convert SQL query statements into visual representations understandable by novice database users, and, in the compliment, which convert graphically or visually represented queries into SQL format statements usable in existing databases and network environments.

SUMMARY OF THE INVENTION

The present invention provides a method, system and program for comprehensively and bilaterally translating between SQL query statements and equivalent visually or graphically depicted query representations. The two-way conversion is implemented using data structures. In the case of conversion between an SQL statement and the equivalent visual query, a parser divides the SQL statement and identifies the equivalent data structure. If desired, the parser can include resources to identify non-ANSI SQL statements, so that such unique elements of the SQL statement can be selectively translated by the user. Thus, in one aspect, the invention provides a means from migrating from the multitude of existing SQL formulated query statements to their graphic progeny.

The complementing translation, from a visual query to SQL equivalent, is preferably accomplished when the visual query is defined, by incrementally creating the data structure as the query is graphically formulated. The data structure is then used to generate the corresponding SQL query statement.

Translation between one data structure, such as the graphical query representation, and a second data structure, such as that associated with the SQL statement query, is accomplished thru a linking data structure. To accomplish this, the data structures are comprised of relational lists.

The graphical query is preferably formulated on a workstation. A representative workstation includes a windowing display suitable to depict individual SQL clauses in distinct windows. In this context, the user manipulates the arrangement of each clause within the context of a window and then links the clauses by window association. SQL query formulation is performed by conventional prompt line or through the practice of query by example formulations.

Bidirectional translation between an SQL or text formulated query statement and the equivalent visual or graphically depicted query provides a contemporary user with a broad base of resources. Preexisting SQL query statements can be graphically depicted for consideration and revision through a mere entry of the statement into the workstation. Thereby, the mysteries of existing SQL libraries are exposed to novice relational database users. On the other hand, such users are provided a visual context within which to formulate new queries, and to have such new queries converted to SQL statements directly applicable to a broad base of existing relational database systems.

These and other features of the invention will be more clearly understood and appreciated upon considering the detailed embodiment discussed hereinafter.

BRIEF DESCRIPTION OF THE DRAWINGS

FIGS. 3–7 schematically depict a set of common data structures for bidirectional translation.

DESCRIPTION OF THE PREFERRED EMBODIMENT

Figure 1:
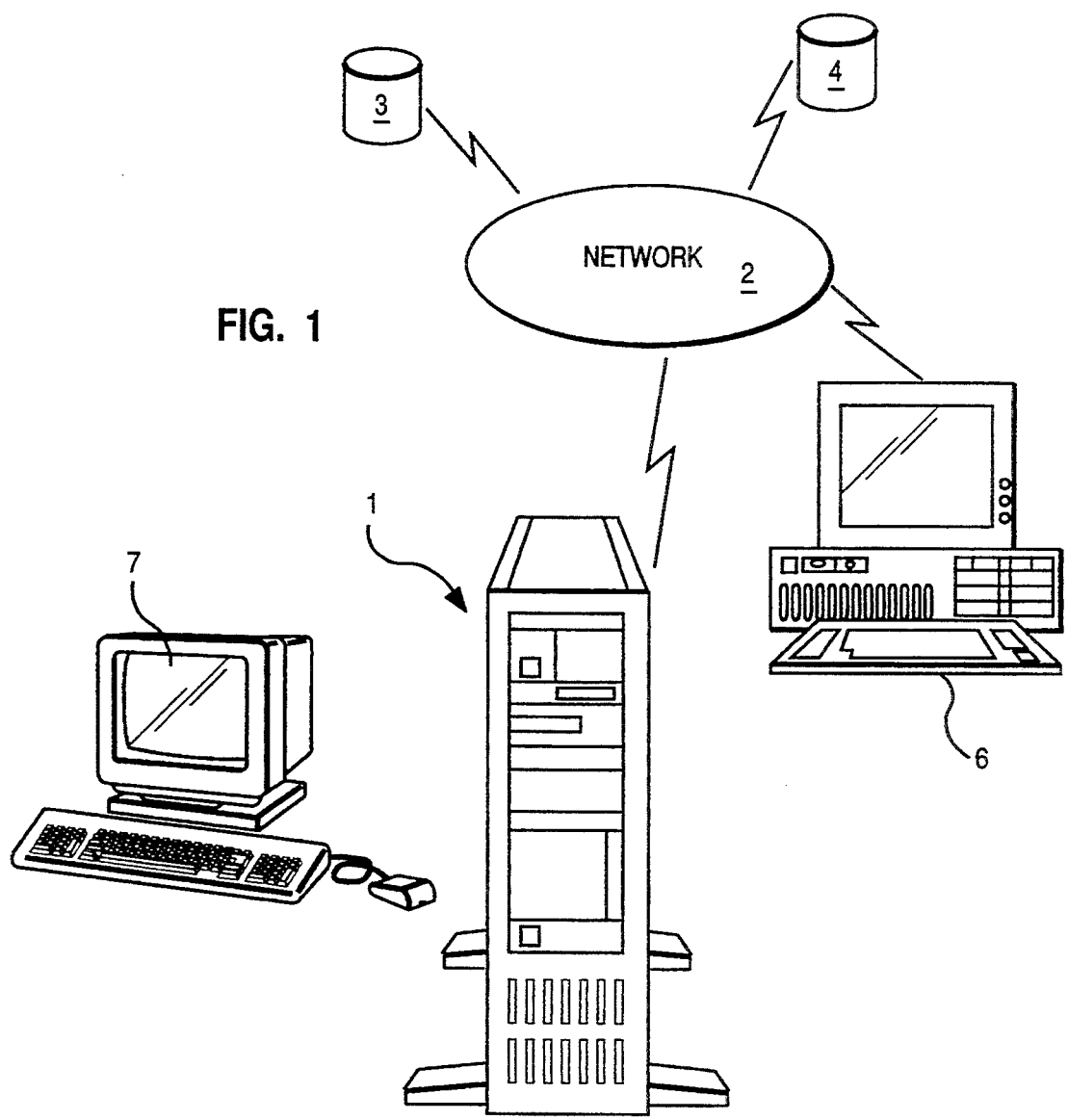
FIG. 1 schematically depicts a workstation connected to a network having a relational database.
Figure 48:
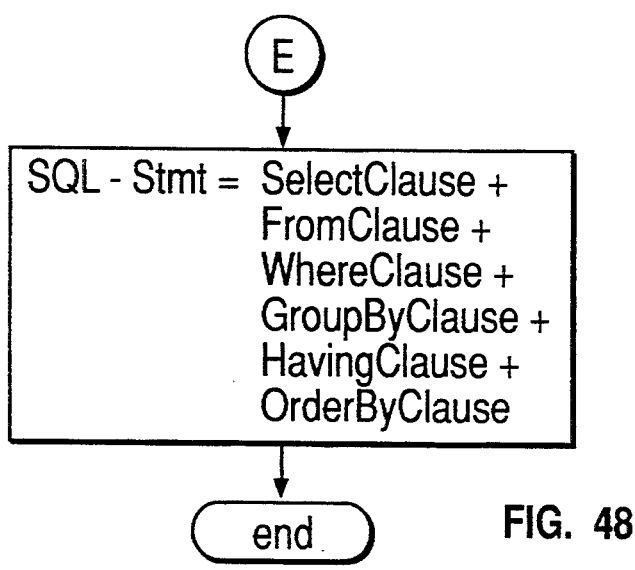
FIGS. 44-48 schematically depict by flow diagram the steps for converting a common data structure to an SQL query statement without set operations.

Queries which seek to obtain information from relational databases are conventionally defined by ANSI standard structure query language (SQL) statements. These statements define in computer recognizable terms the tables from which the data is to be extracted, the columns of interest, the conditions rows must satisfy, what columns are to be included, how the select columns are to be grouped, the order of the columns, distinctiveness constraints in the columns, connections of data within tables, and lower level or subqueries to be integrated into the base queries. A simple text describing SQL and its uses is the IBM Operating Systems/2 Extended Edition Database Manager Structured Query Language (SQL) concepts booklet available from IBM Corporation. In addition to the ANSI standard SQL statements, there exist a number of nonstandard SQL statements within the relational database community. Thus, any bidirection translation resource must have the diversity of structure to interface a broad spectrum of relational database SQL language variances.

As noted earlier, comprehensive bidirectionality of the translation is important from the perspective of migrating from established SQL queries to their graphical or visual query equivalents. It is clearly inefficient to require the regeneration of existing SQL queries into the visual environment. At the same time, new visual queries should be available in SQL format for use on existing hardware with existing and relational databases. It is this comprehensive bidirectionality that is lacking in the prior art.

There presently do exist technologies which provide very limited translation from visual or graphical depictions of queries to their SQL equivalents. Representative examples are described in "Graphical User Languages for Querying Information: Where to look for criteria?" by Hrohr, as appeared in 1988 *IEEE Workshop On Visual Languages*, May, 1988, pages 14-20; "Design and Implementation of An Interactive Graphical Query Interface for a Relational Database Management System" by Czejdo et al, as appeared in 1988 *IEEE Workshop On Visual Languages*, May, 1988 pages 21-28; and "End-User Access to Relational Databases Metaphor Database Server" by Benjamin et al, as appeared in the summer 1987 issue of *InfoDB*. Unfortunately, the translations described in such publications were lacking both in comprehensive bidirectionality and scope of diversity. Namely, the focus was only directed toward translating from visual or graphical depictions to SQL. Furthermore, the translations were not ANSI standard SQL comprehensive, in that the row condition was incapable of handling diverse logical relationships, no mathematical relationships were permitted for column data, and, foremost, subquery handling was absent.

The article "User Interfaces for Structural Engineering Relational Database" by Howard et al as appeared in *Engineering With Computers*, 1988, pages 239-249, recognized the importance of bidirectional translation between a text based query, the defined Engineering Query Language and graphical representations. However the article did not disclose how such desirable objectives could be accomplished. The article recognized the potential need for translating relatively complex query formulations, but made no attempt to present a solution. In contrast, the present invention defines a method, system and program for accomplishing these desirable goals and doing so with the resources to handle complex formulations, including, but not limited to, the definition of complex logical and algebraic relationships between columns and the manipulation of hierarchical queries composed of subqueries.

The invention is preferably practiced in the context of a relational database such as is available in the OS/2 Extended Edition software program available from IBM Corporation. A representative hardware environment is depicted in FIG. 1, including an IBM brand PS/2 workstation, generally at 1, having resident thereon the OS/2 Standard Edition base operating system and the aforementioned OS/2 Extended Edition relational database program. Workstation 1 includes nonvolatile storage for the database, such as a hard disk, optical disk or tape drive media, and means for communicating into a network, generally at 2, having attached thereto further databases 3 and 4 as well as distinct non-proximate workstations such as 6. The fundamental goal is to provide a relatively unexperienced relational database user of workstation 1 with method, system and program resources to create, modify and execute relational database queries encompassing a broad and historical base of information. The invention further contemplates that preexisting queries formulated in classical SQL format be conveyed to workstation 1 and there subjected to conversion into visual or graphical queries equivalent for refinement or execution.

Figure 2:
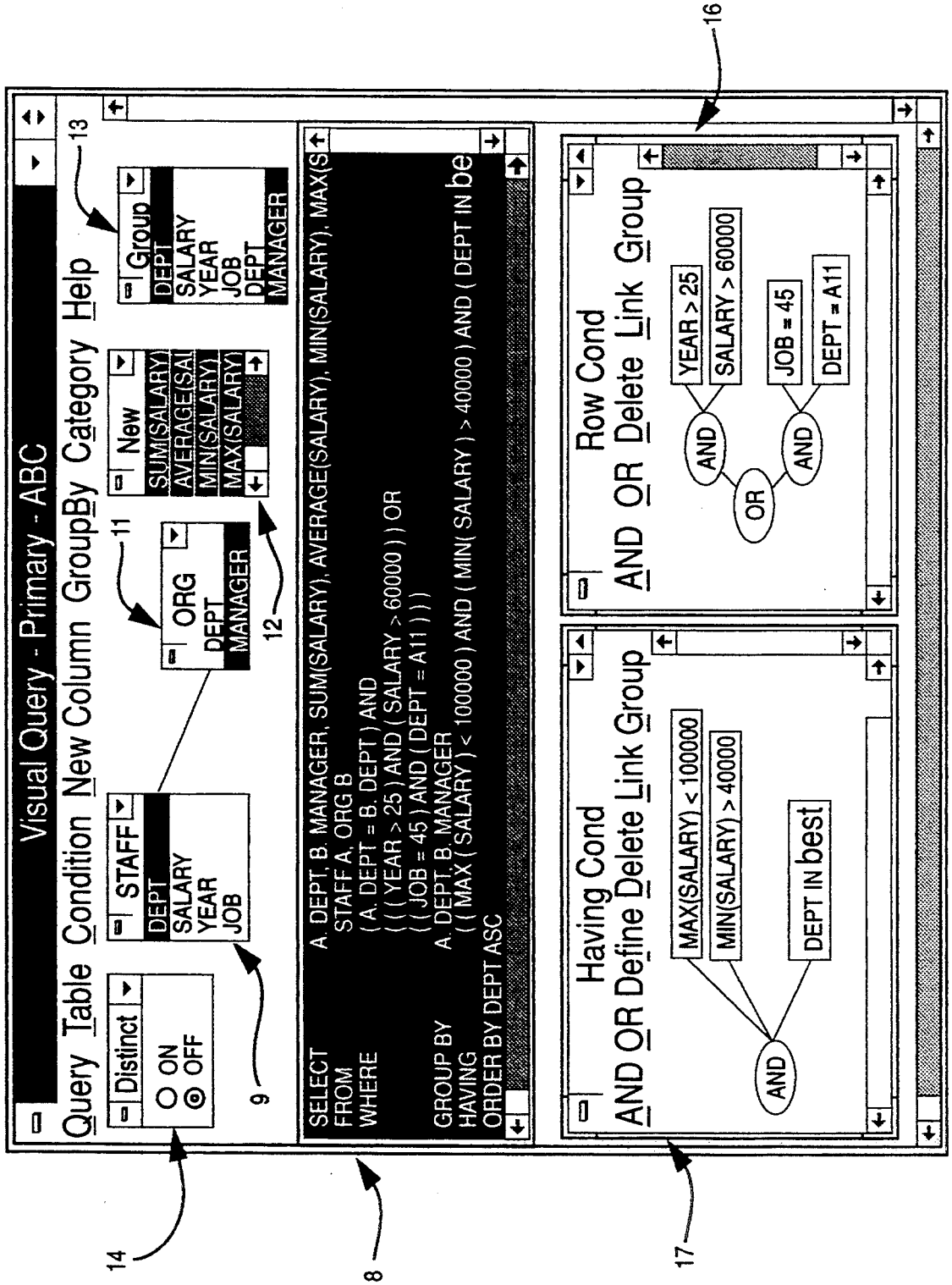
FIG. 2 schematically illustrates a visual query screen, including windows suitable to define queries and a text based SQL equivalent.
Figure 8:
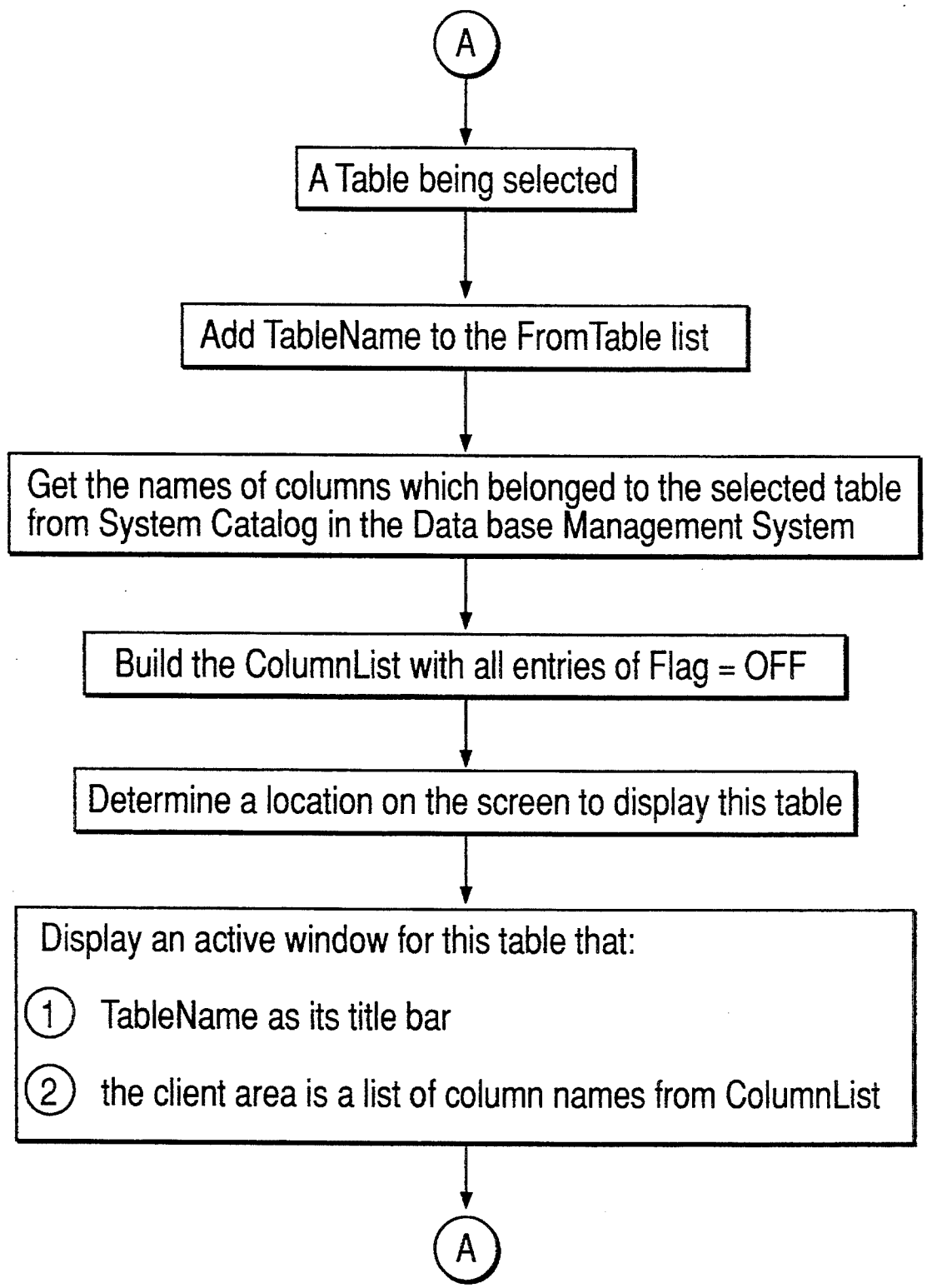
FIGS. 8–27 schematically depict by flow diagram the steps for converting a visual query to a common data structure.
Figure 9:
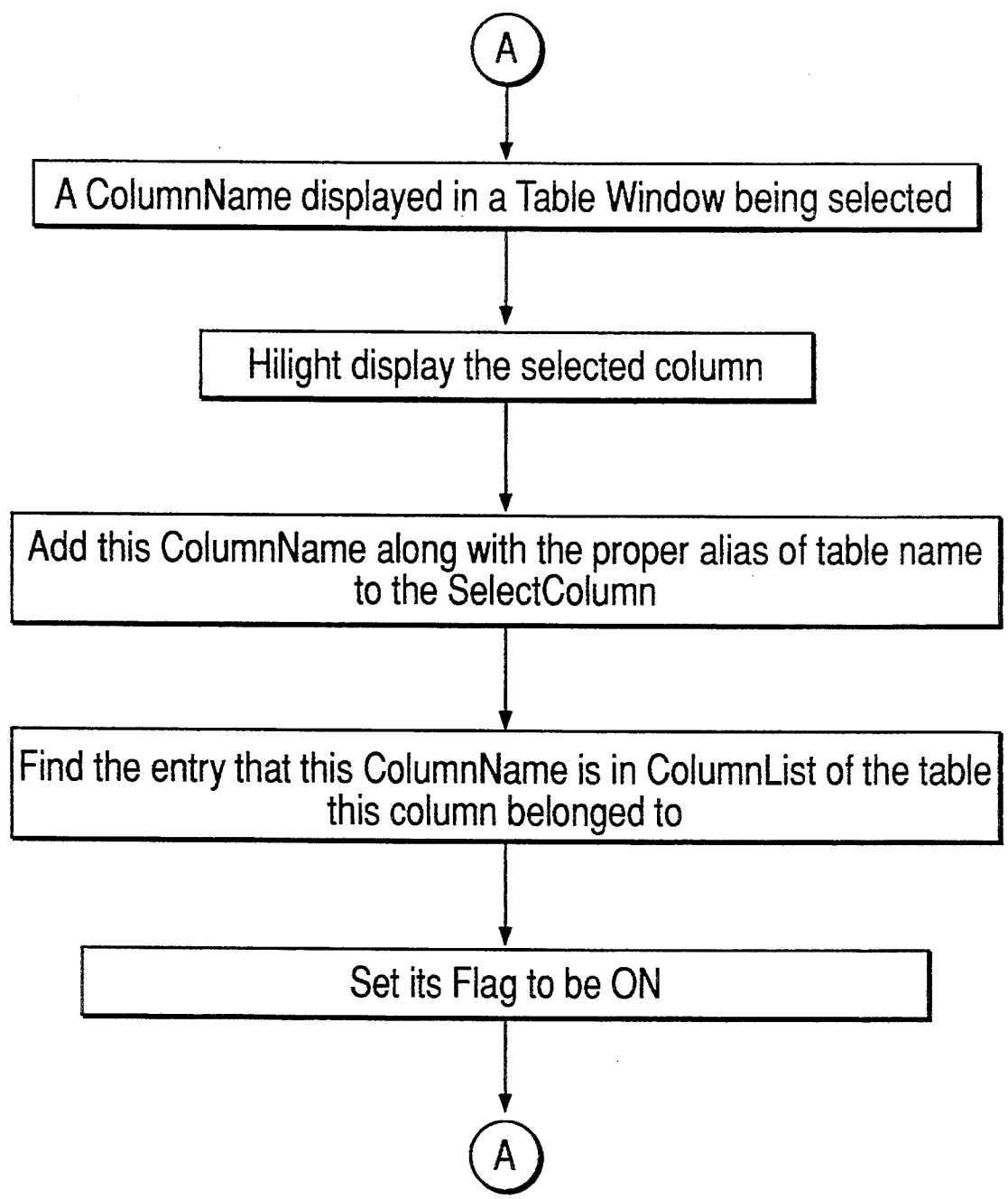
Figure 10:
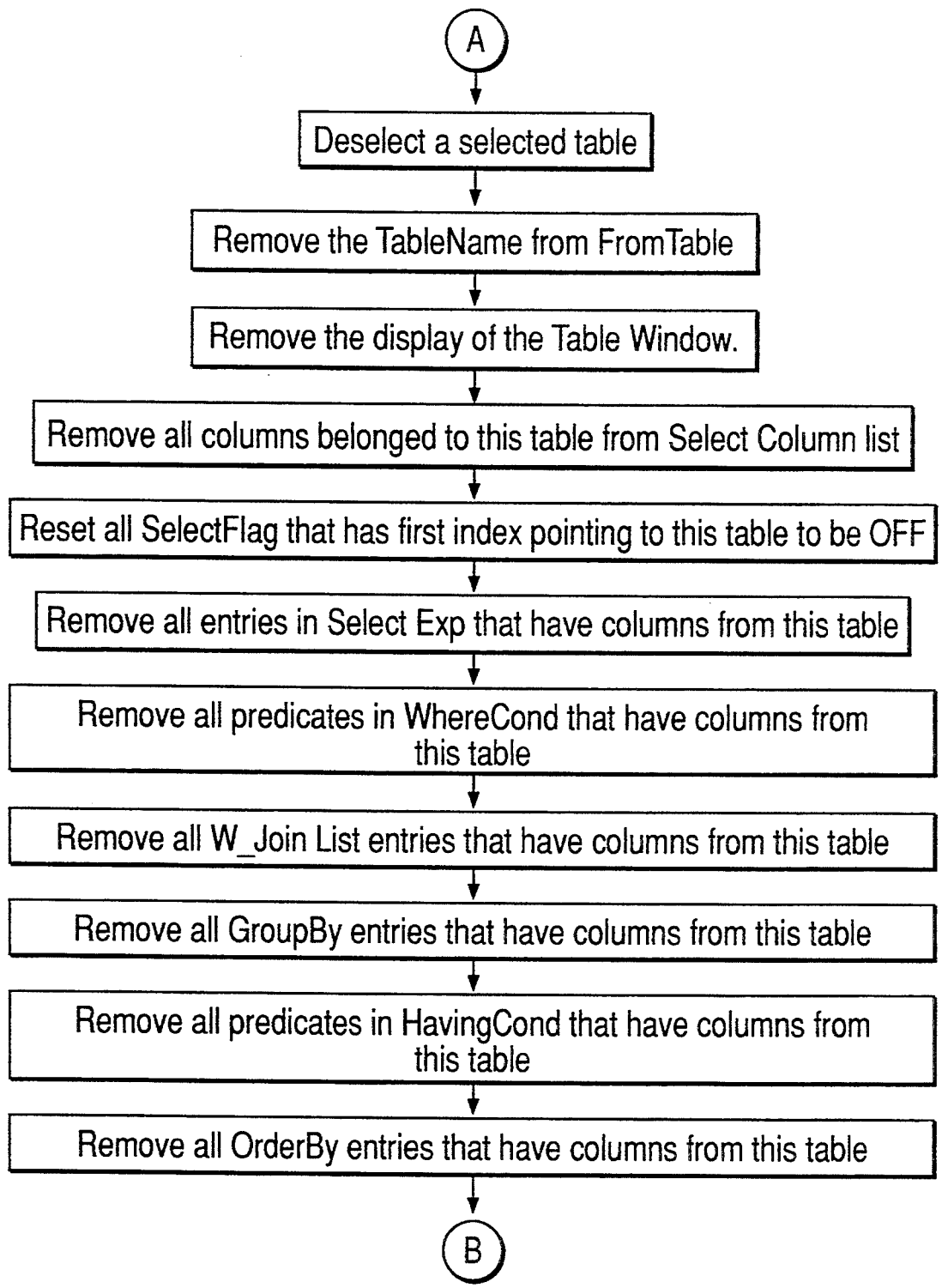
Figure 11:
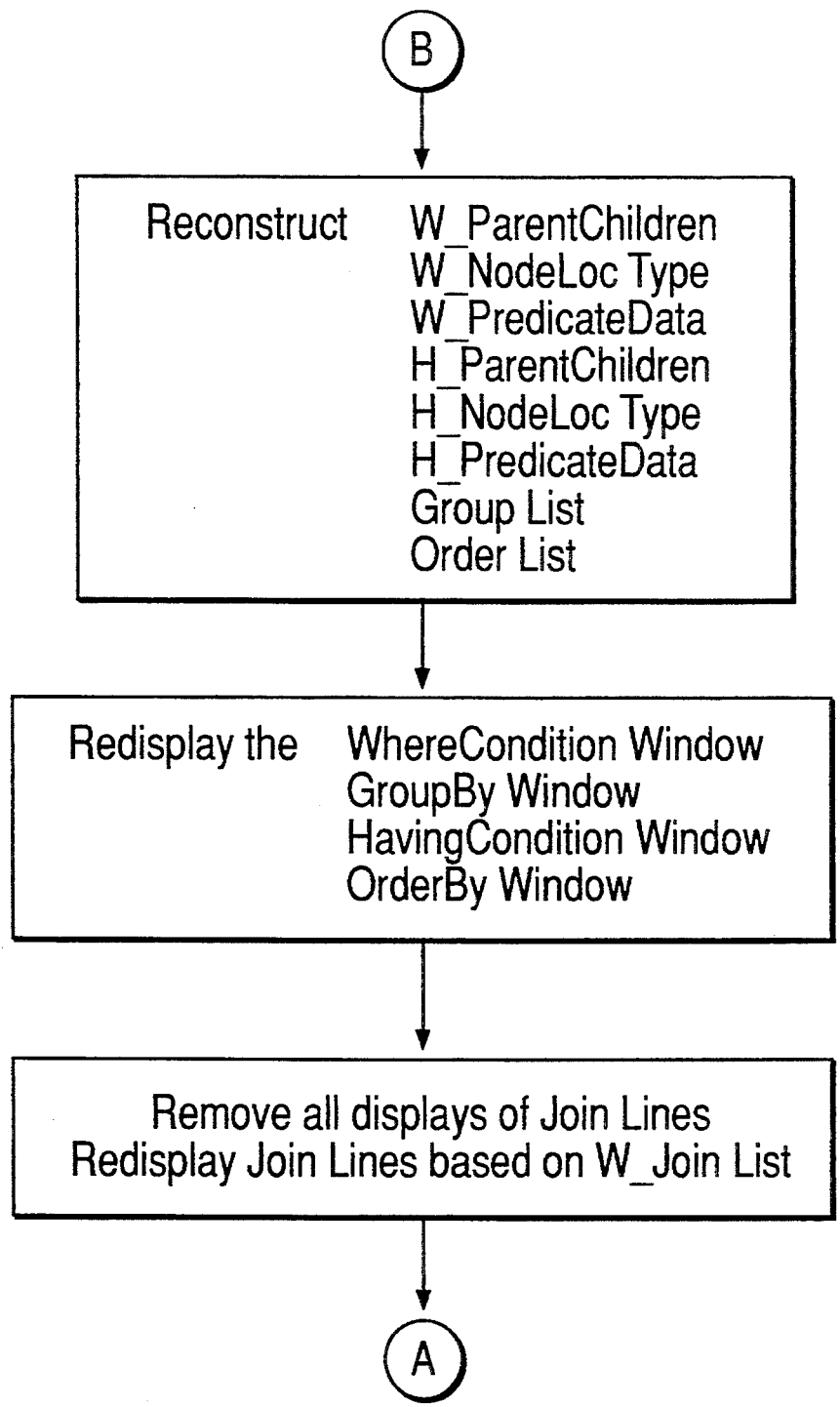
Figure 12:
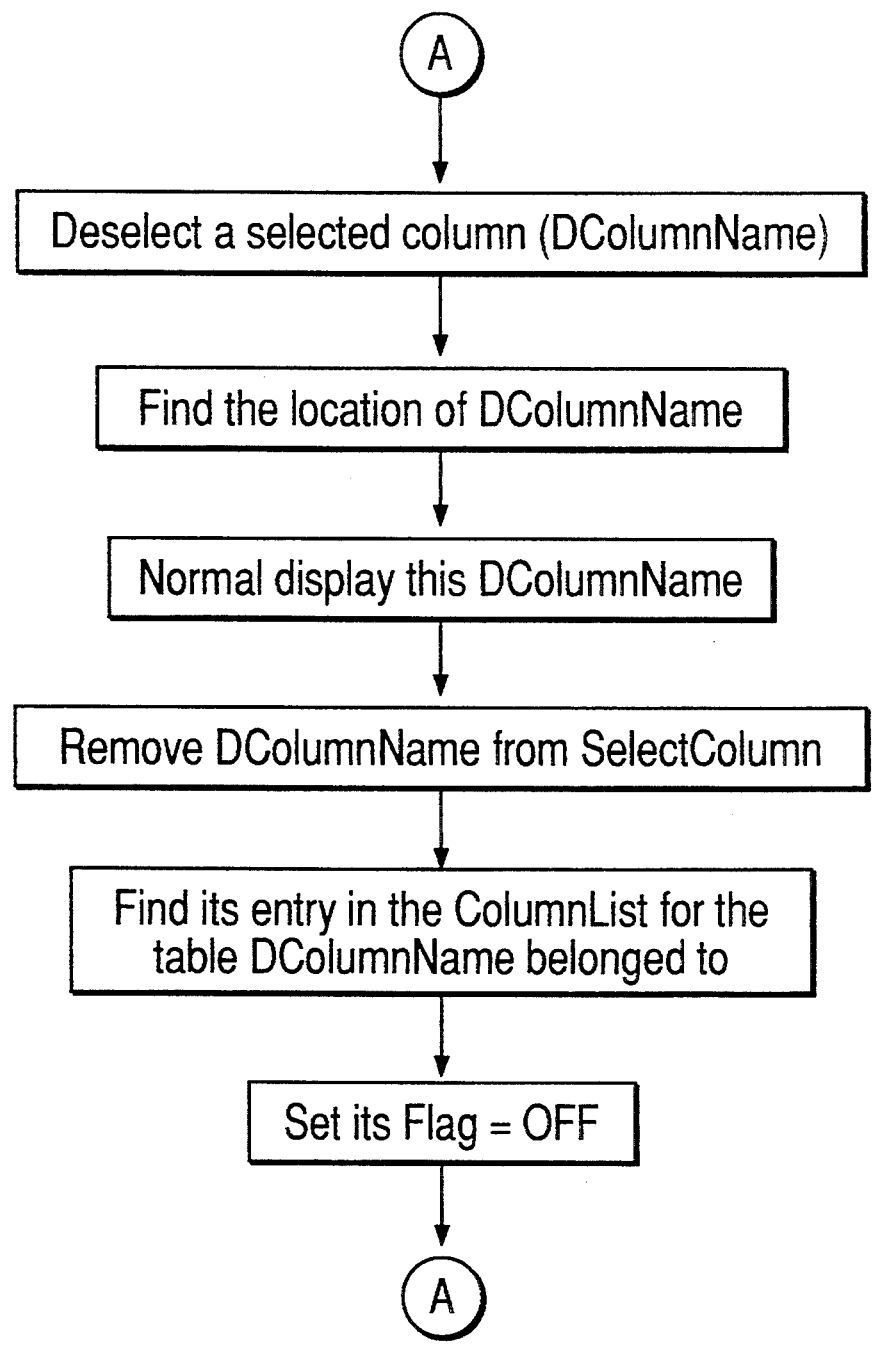
Figure 13:
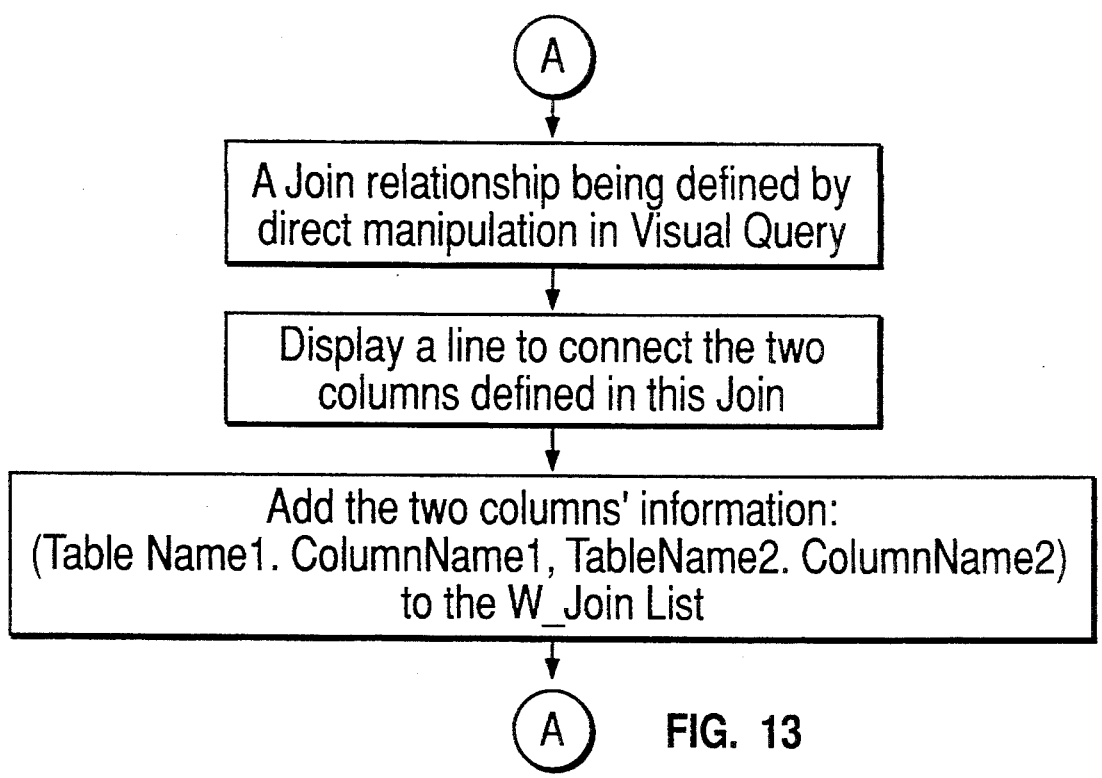
Figure 14:
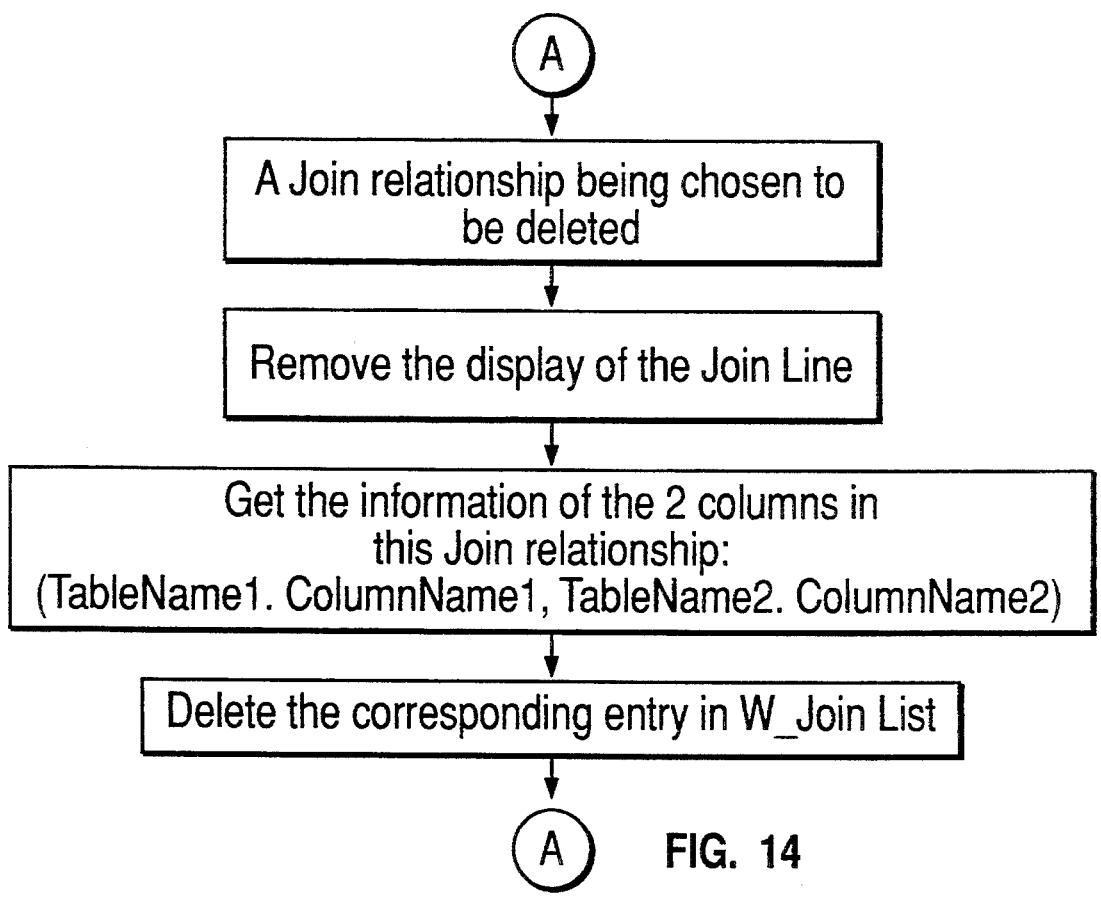
Figure 15:
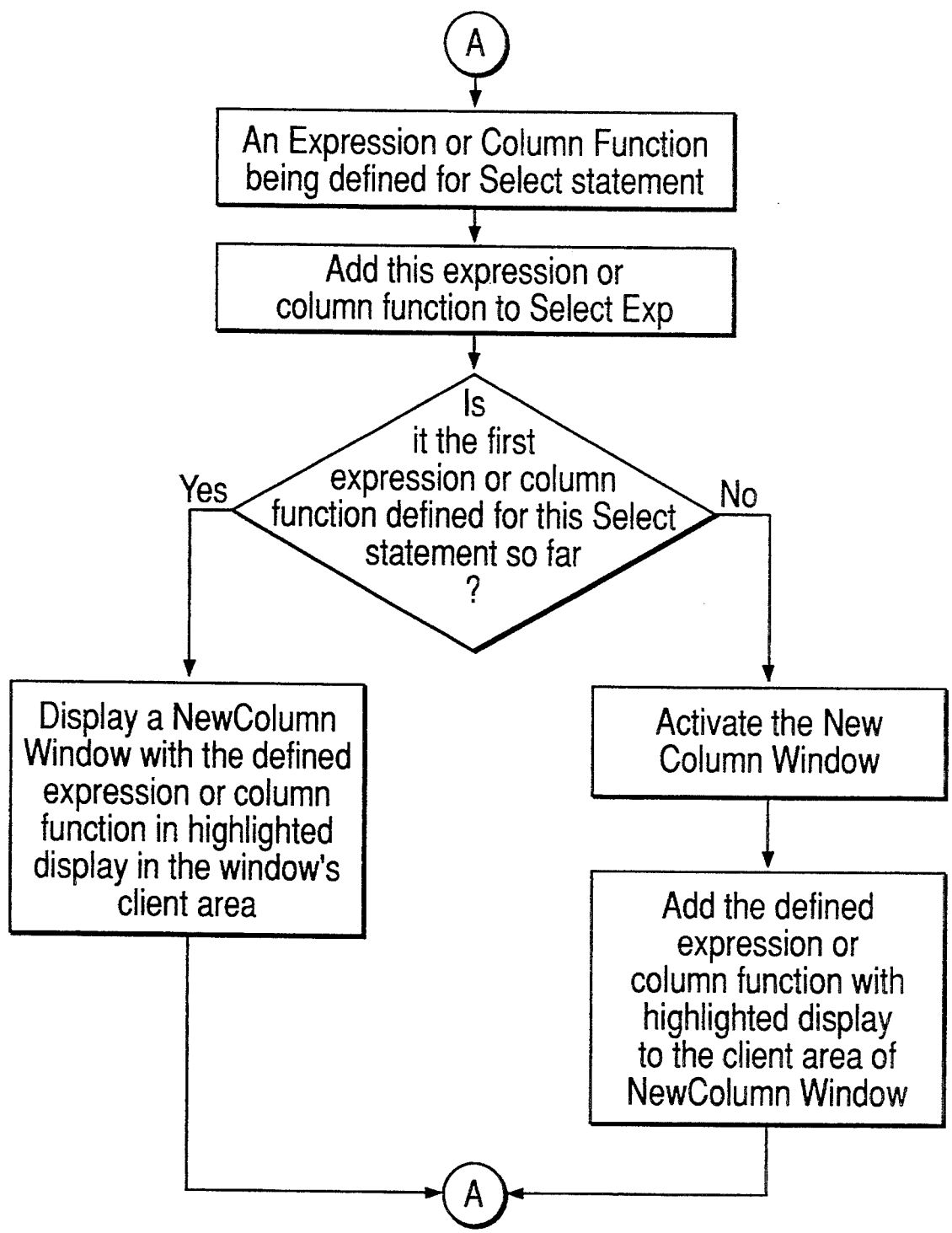
Figure 16:
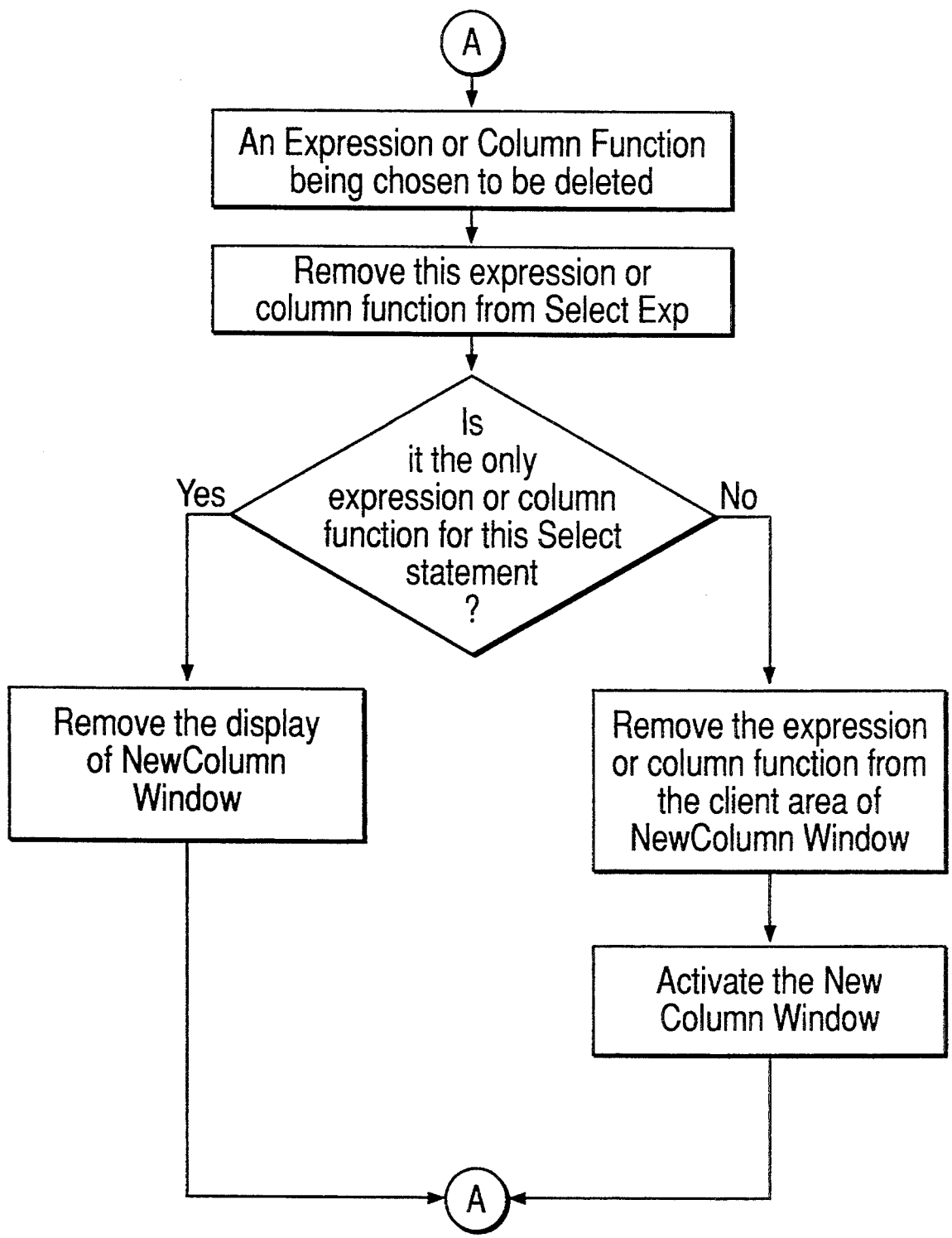
Figure 17:
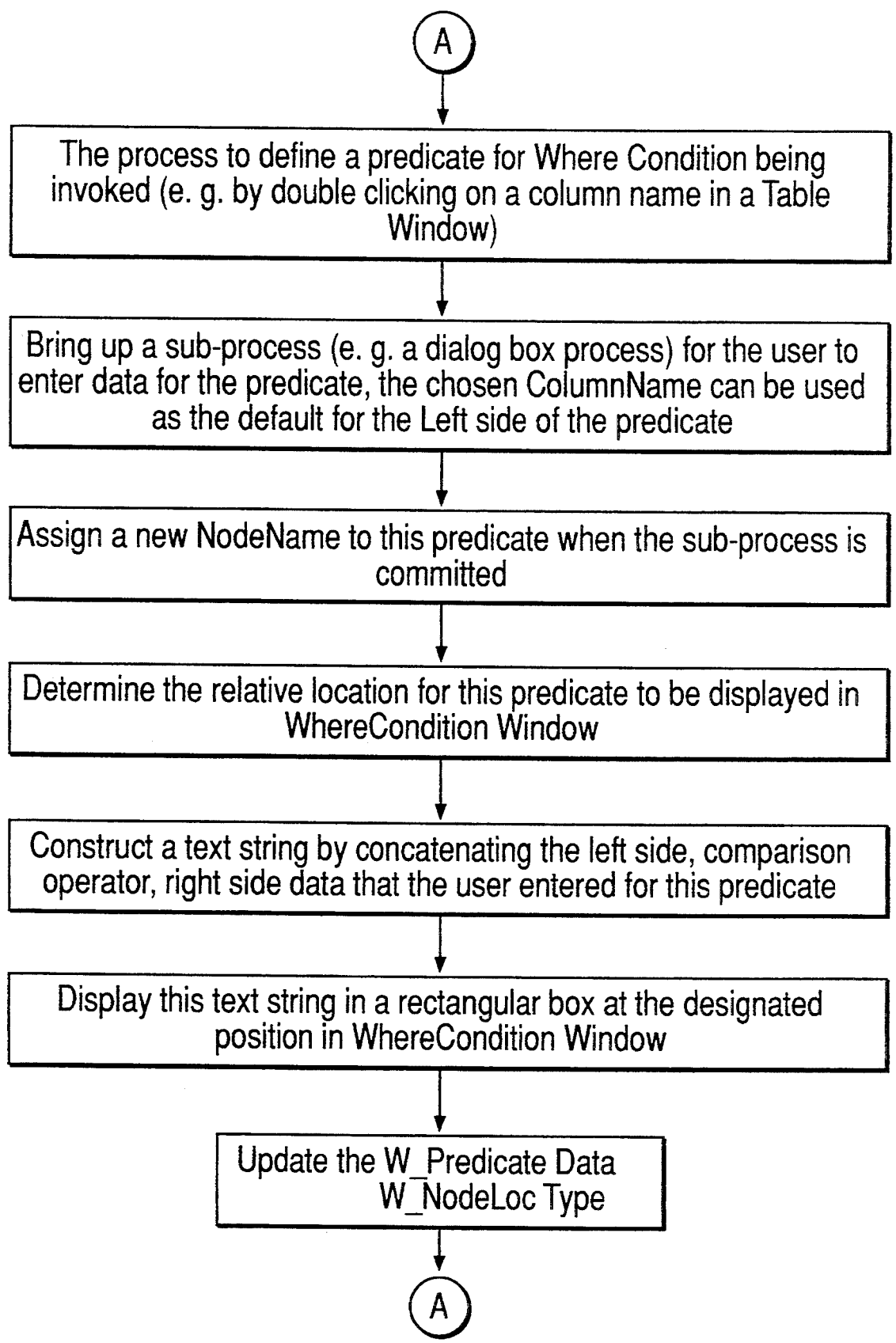
Figure 18:
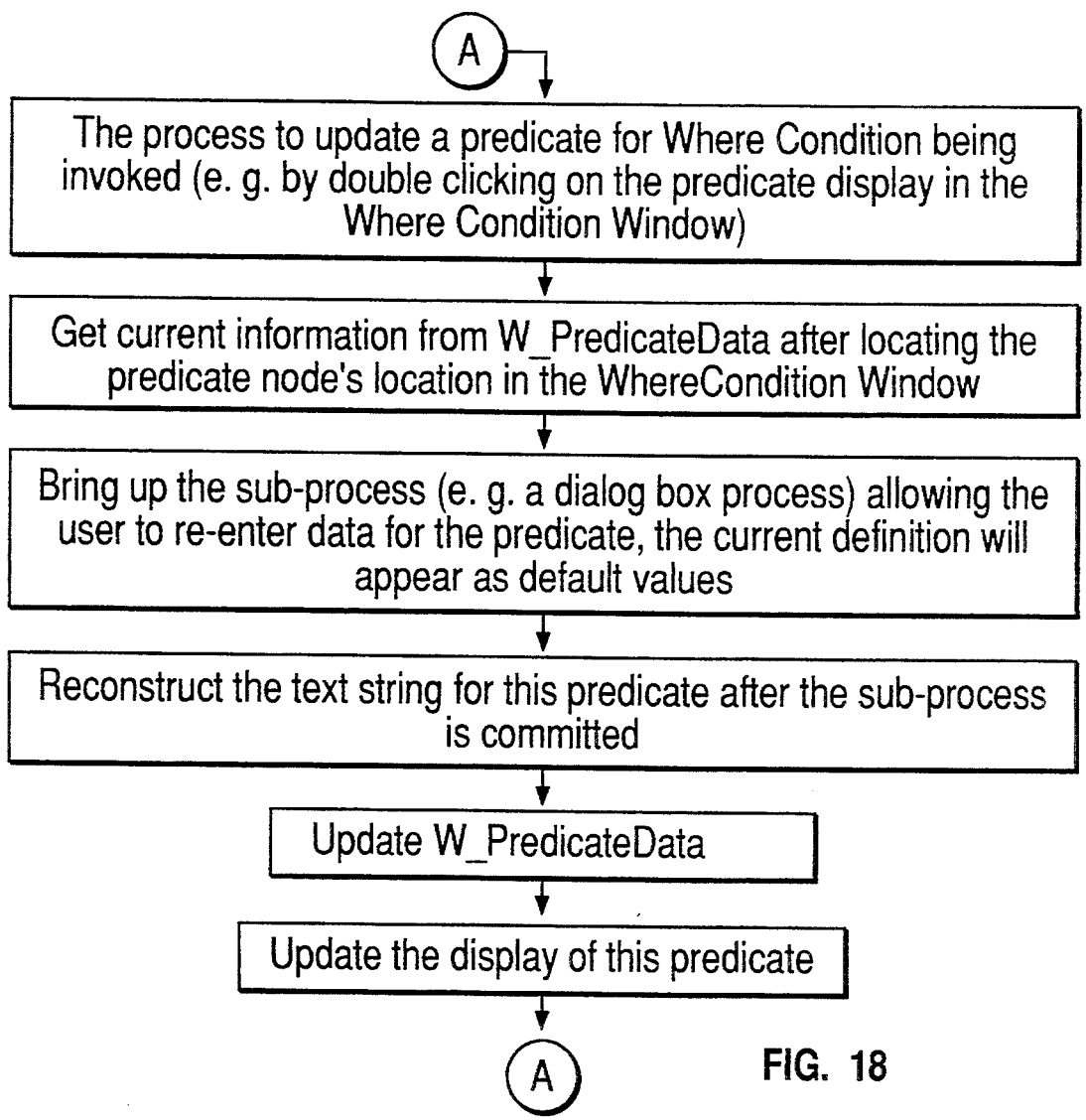
Figure 19:
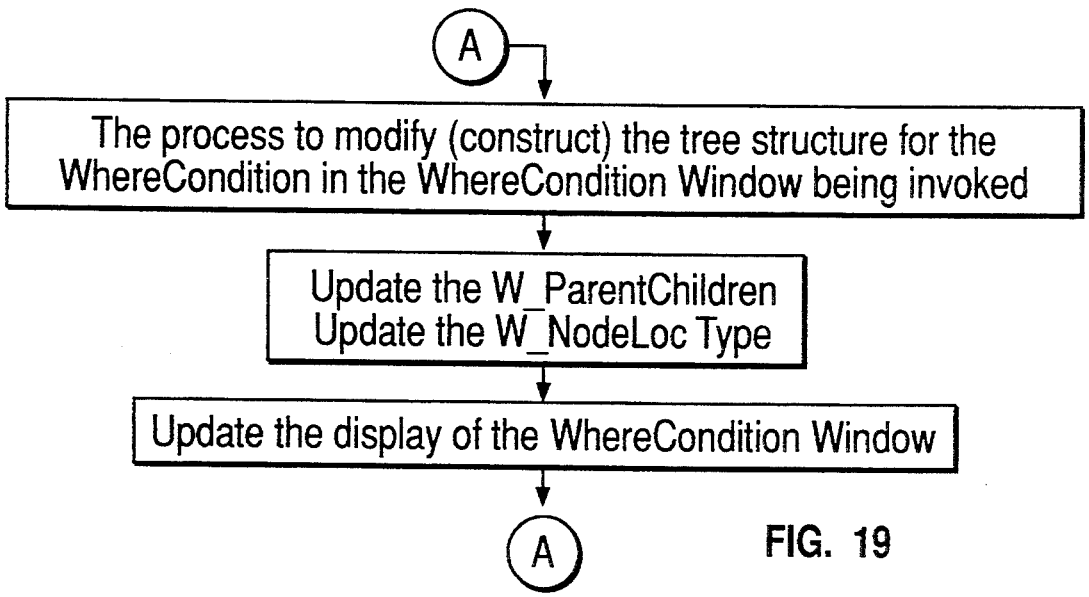
Figure 20:
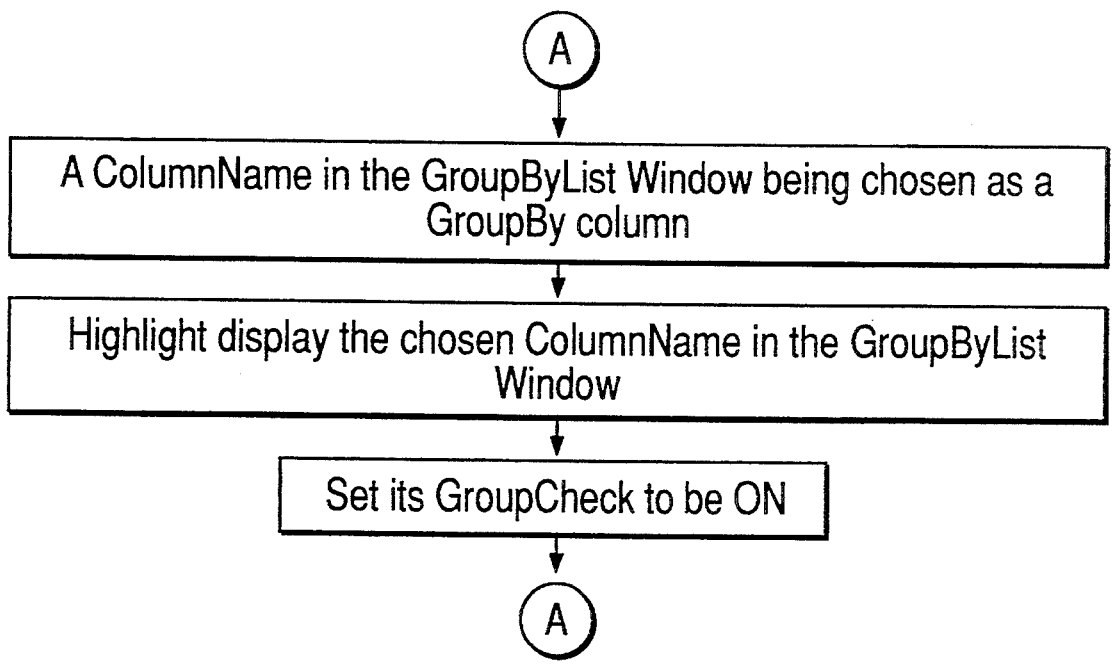
Figure 21:
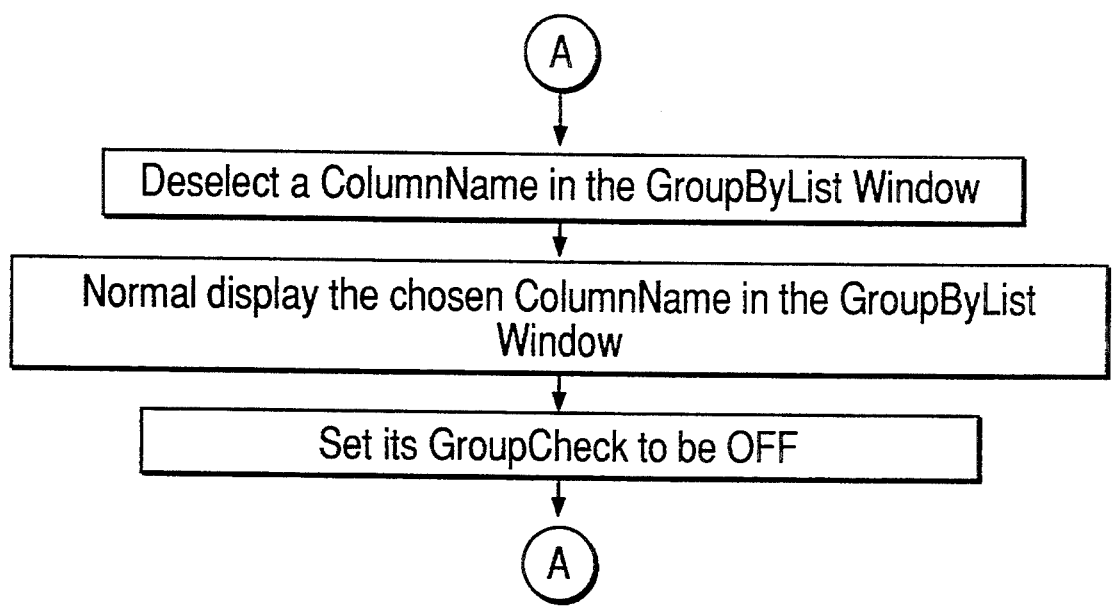
Figure 22:
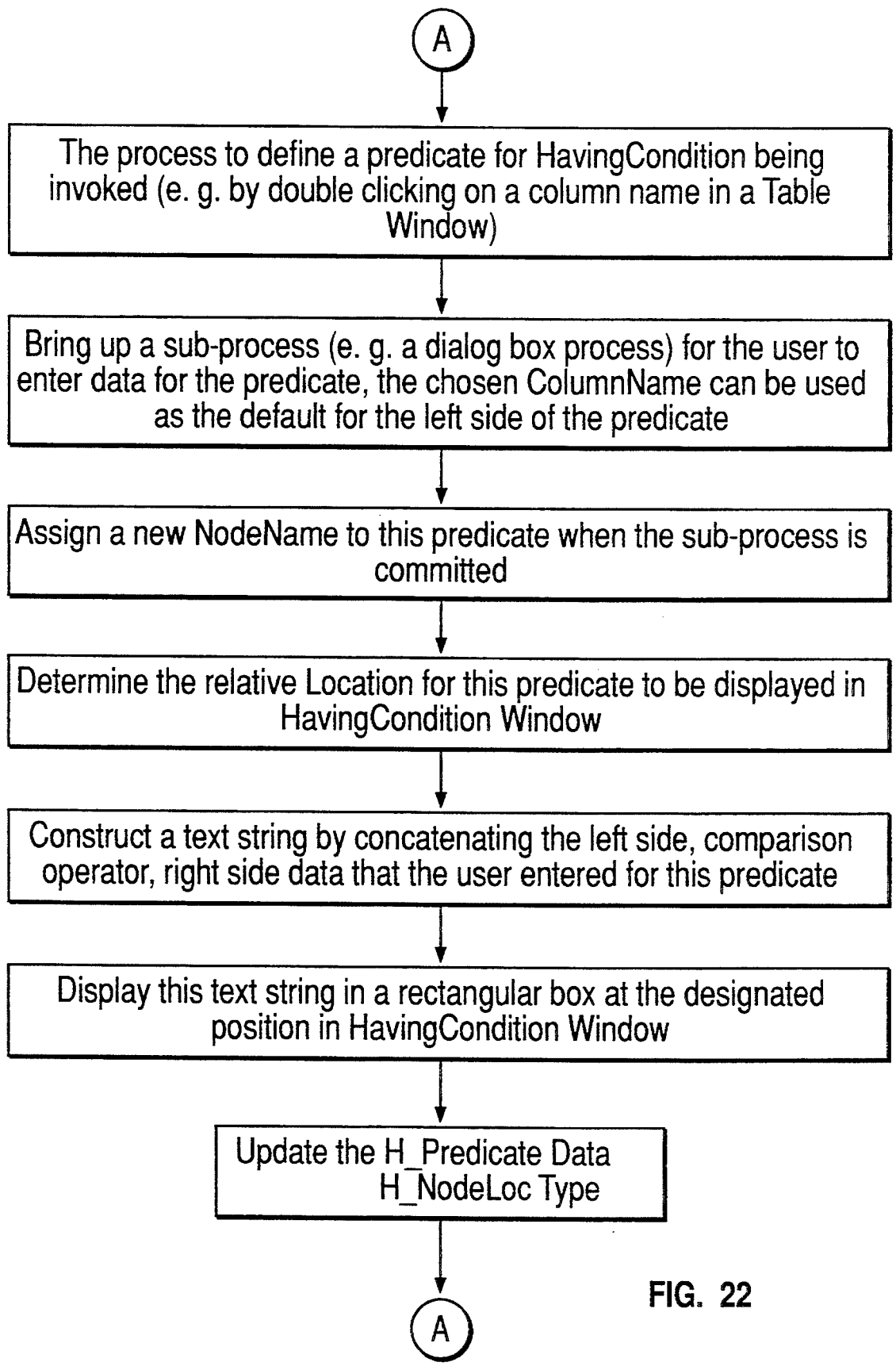
Figure 23:
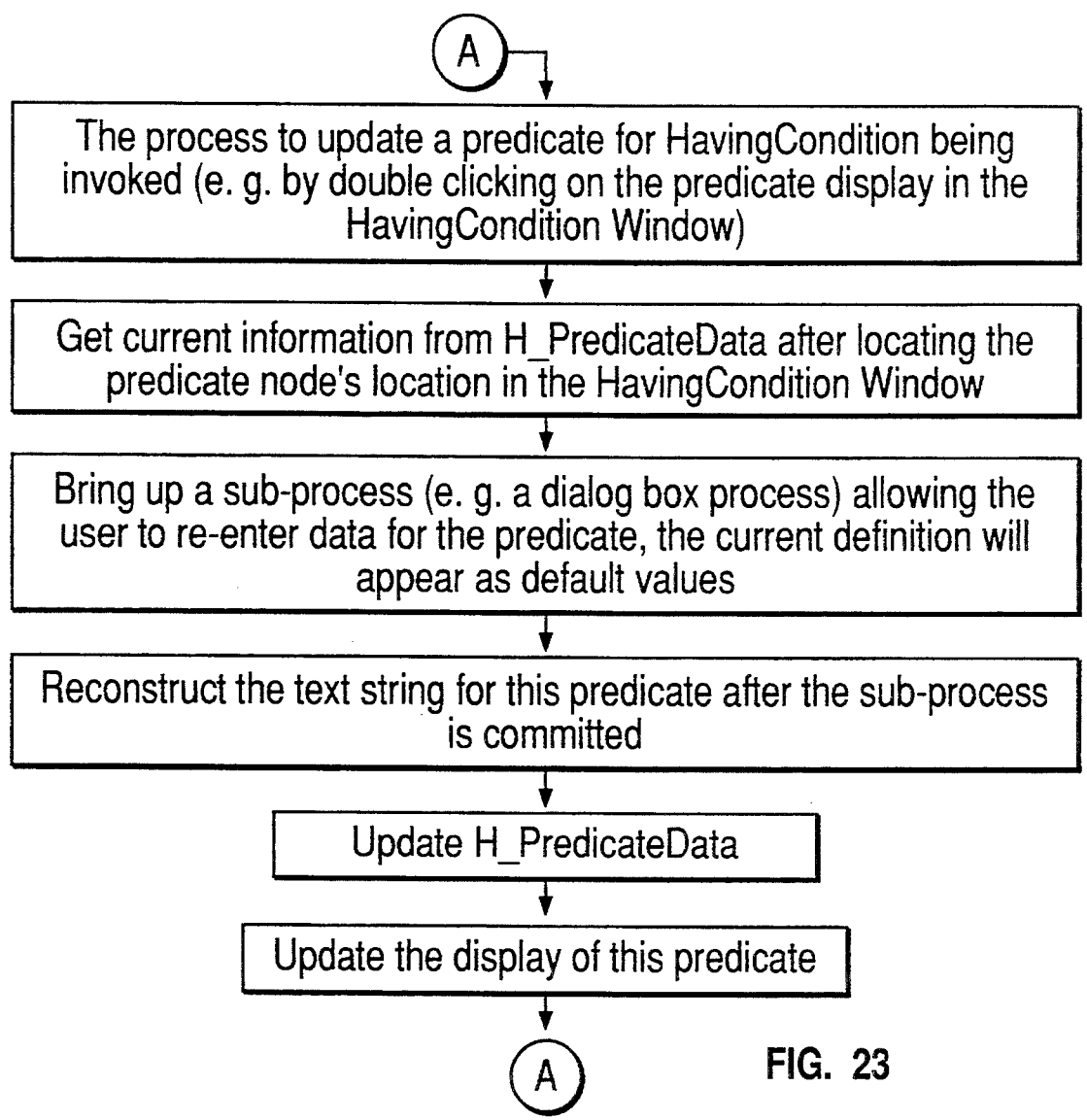
Figure 24:
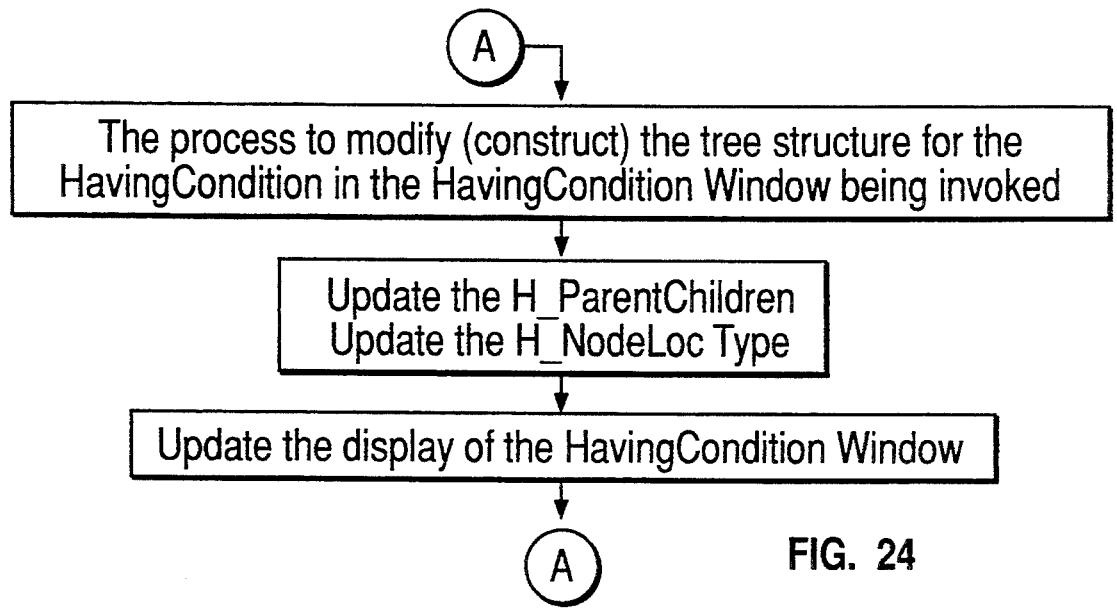
Figure 25:
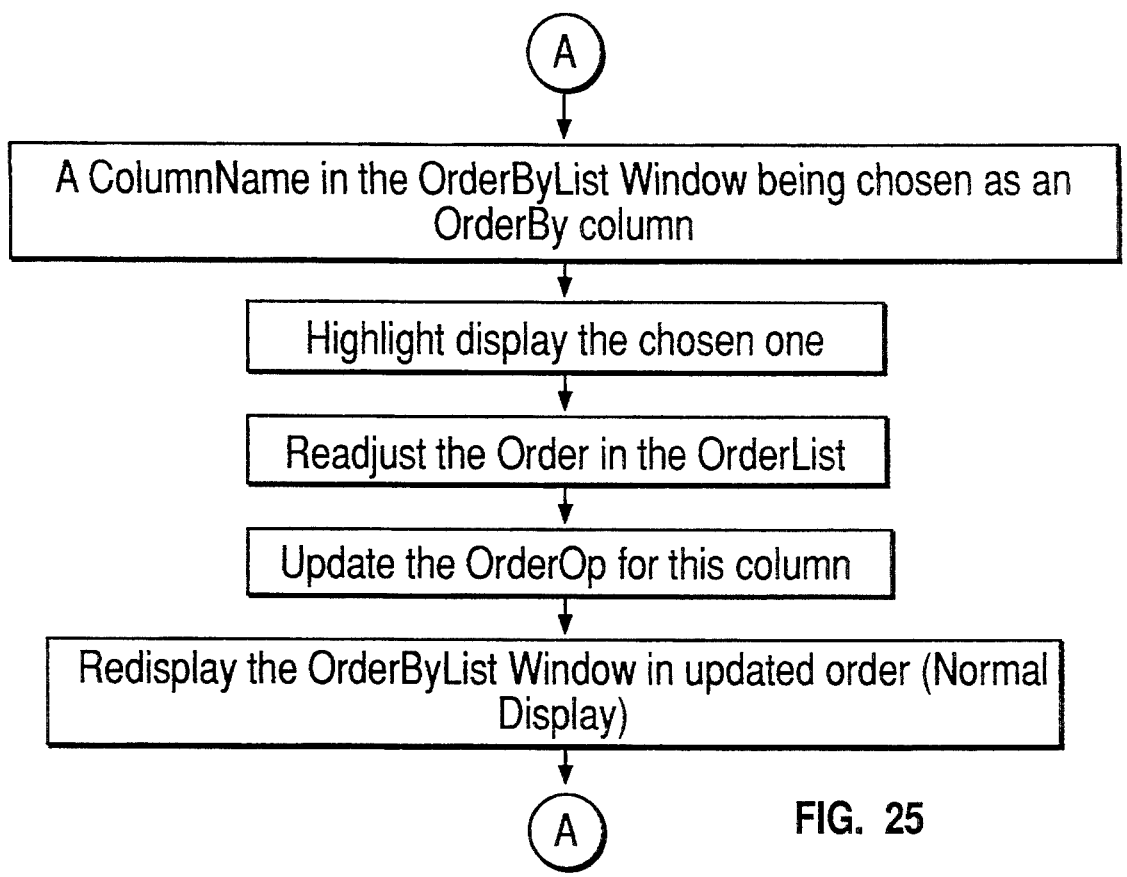
Figure 26:
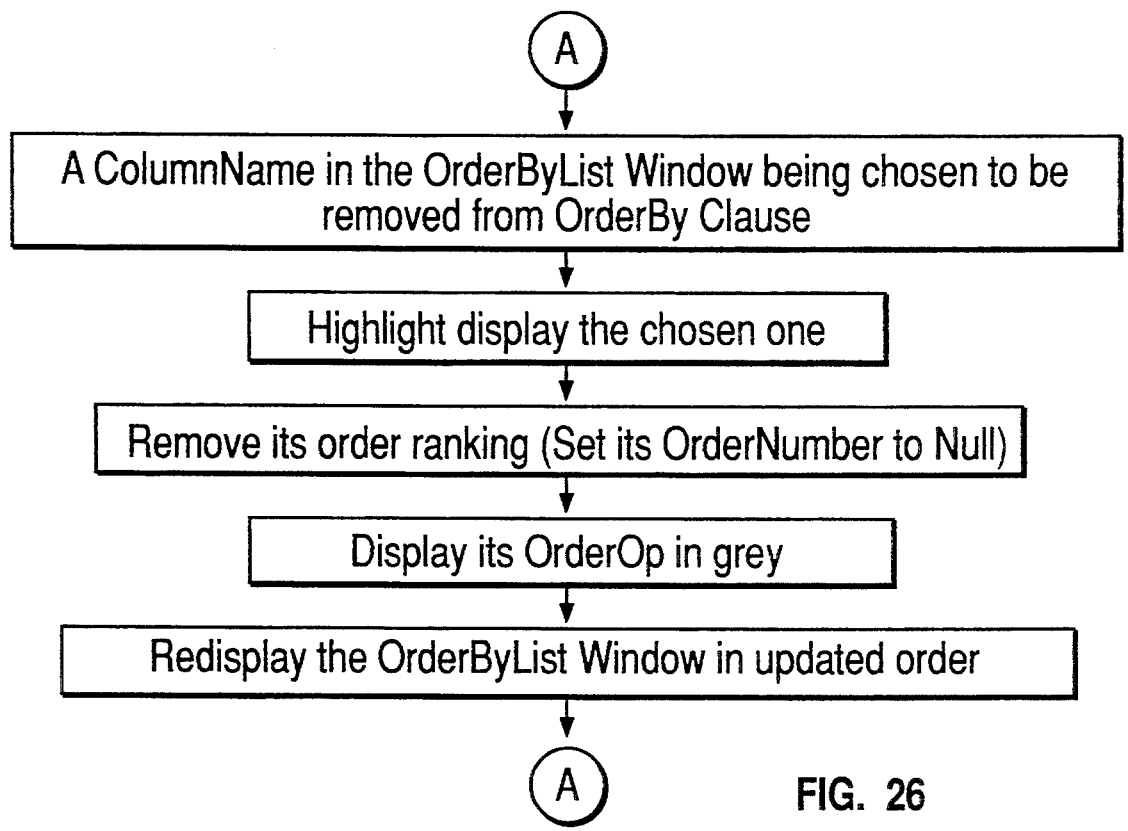
Figure 27:
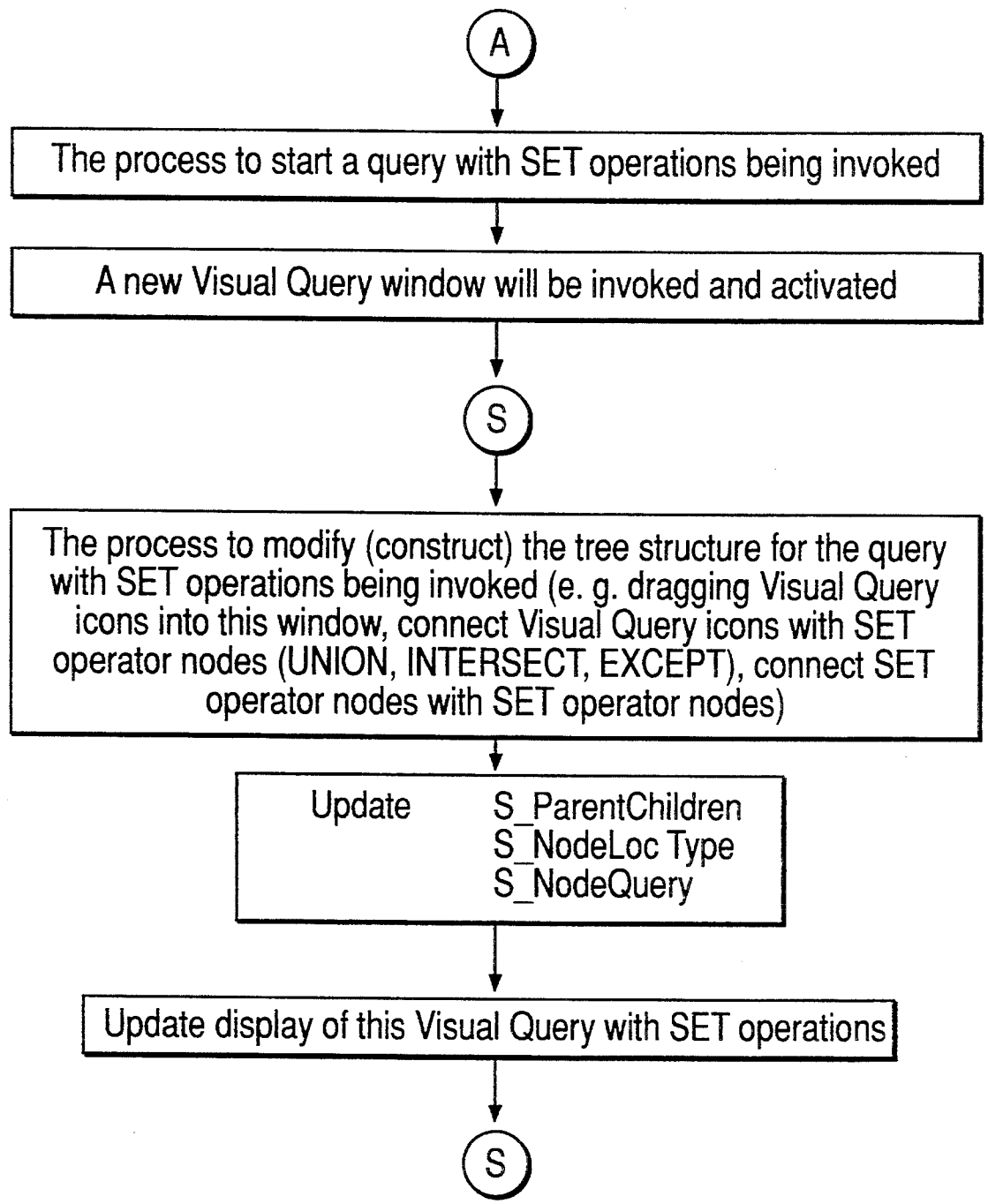
Figure 28:
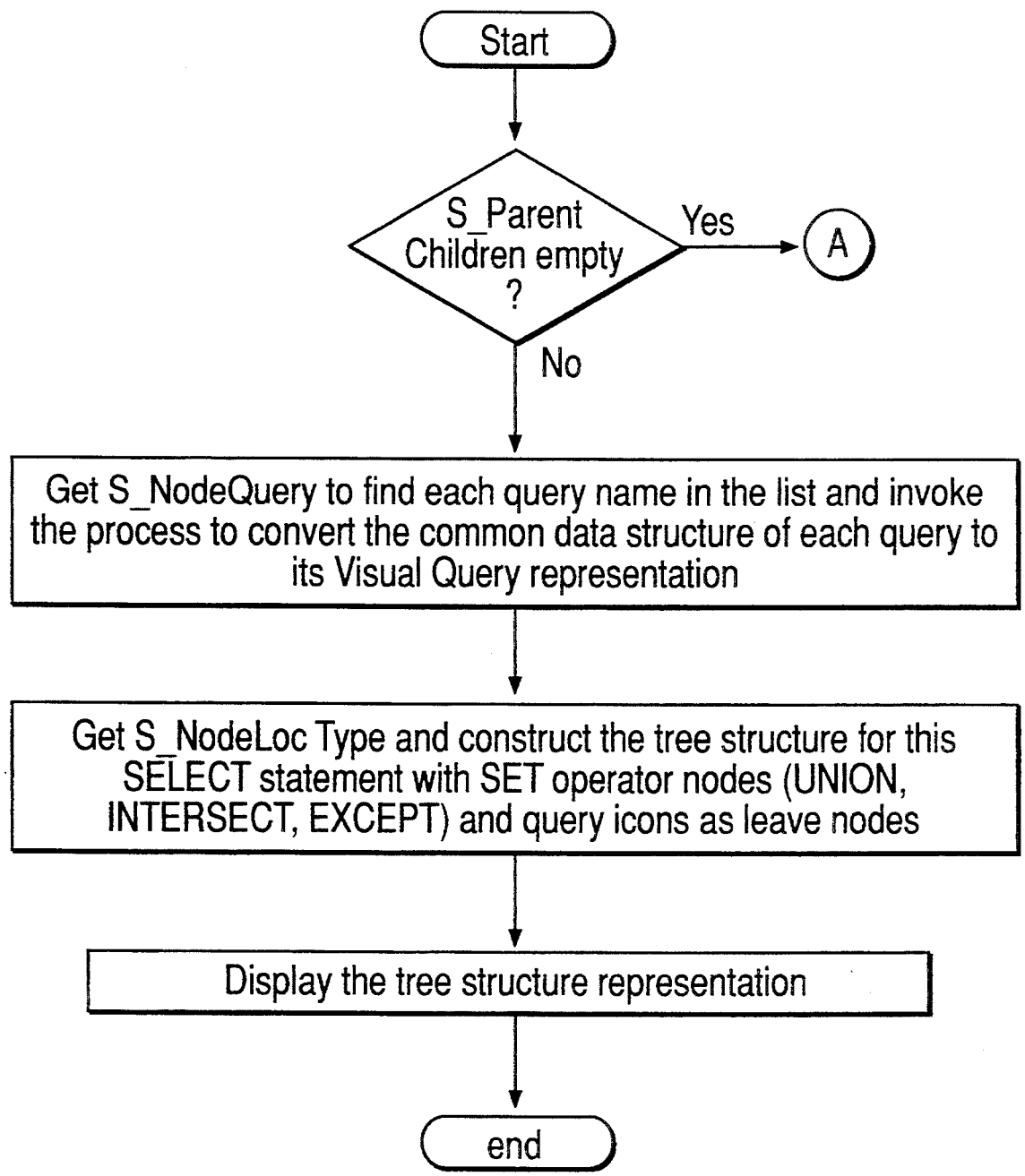
FIGS. 28-33 schematically depict by flow diagram the steps for converting a common data structure to a visual query.
Figure 29:
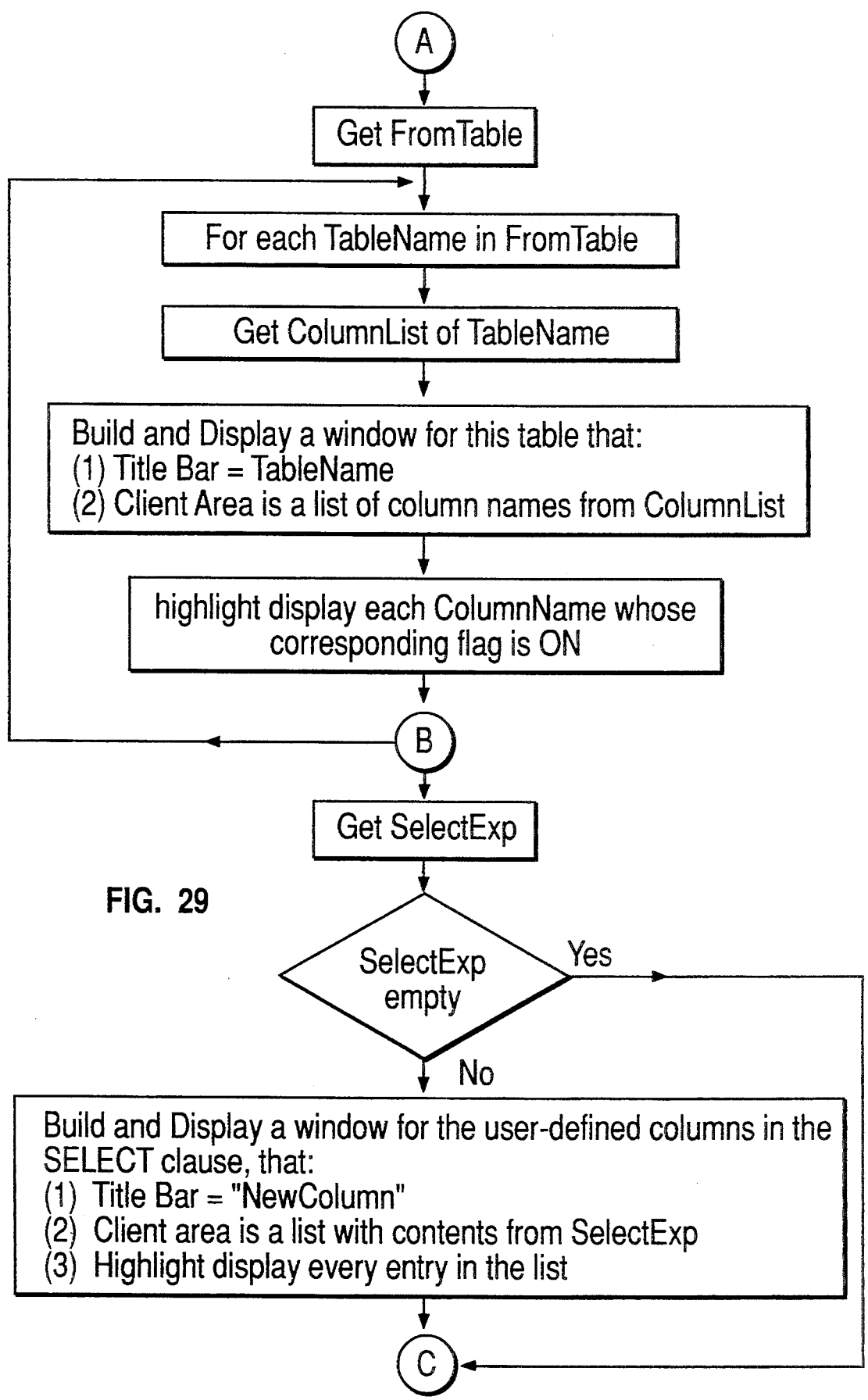
Figure 30:
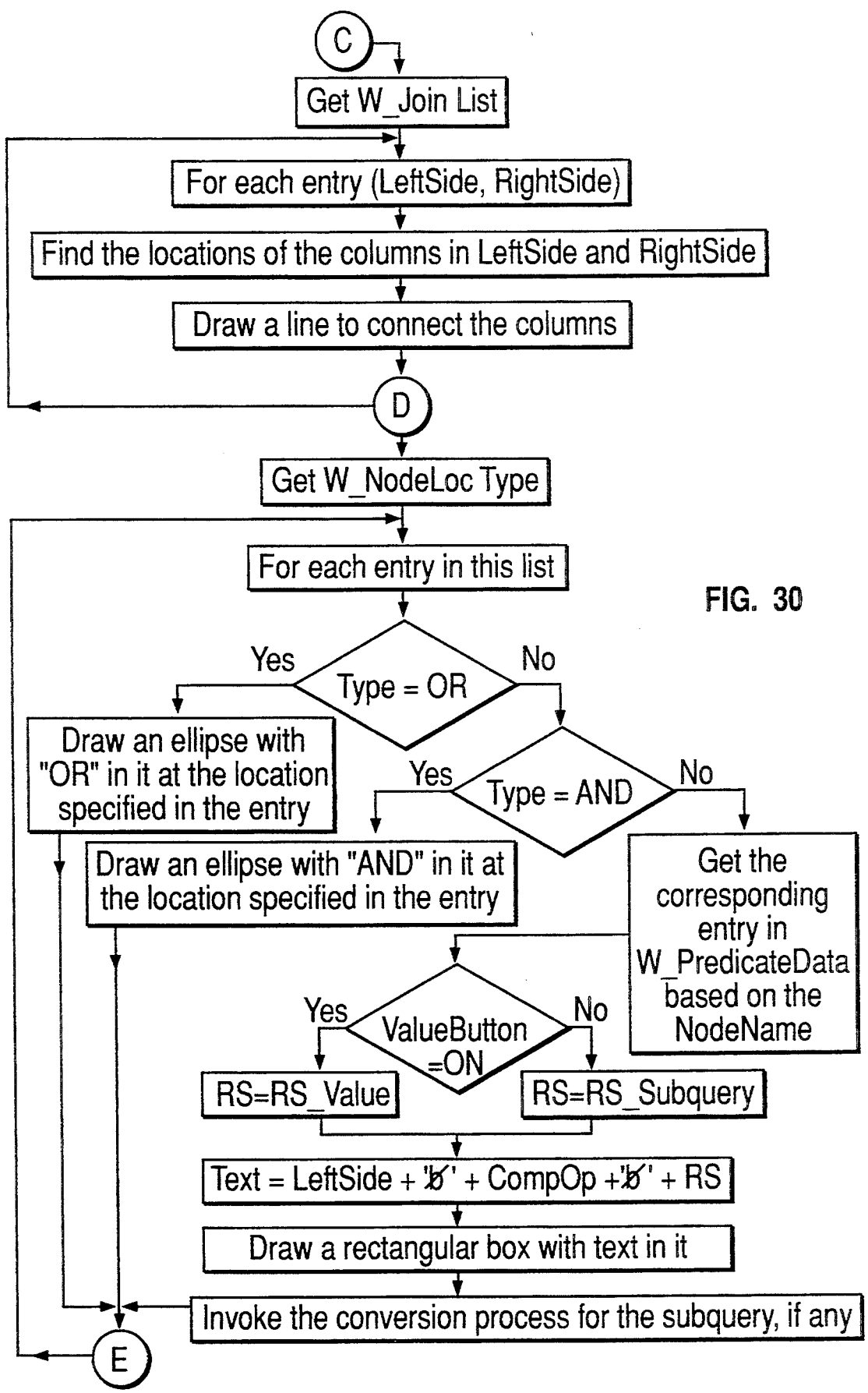
Figure 31:
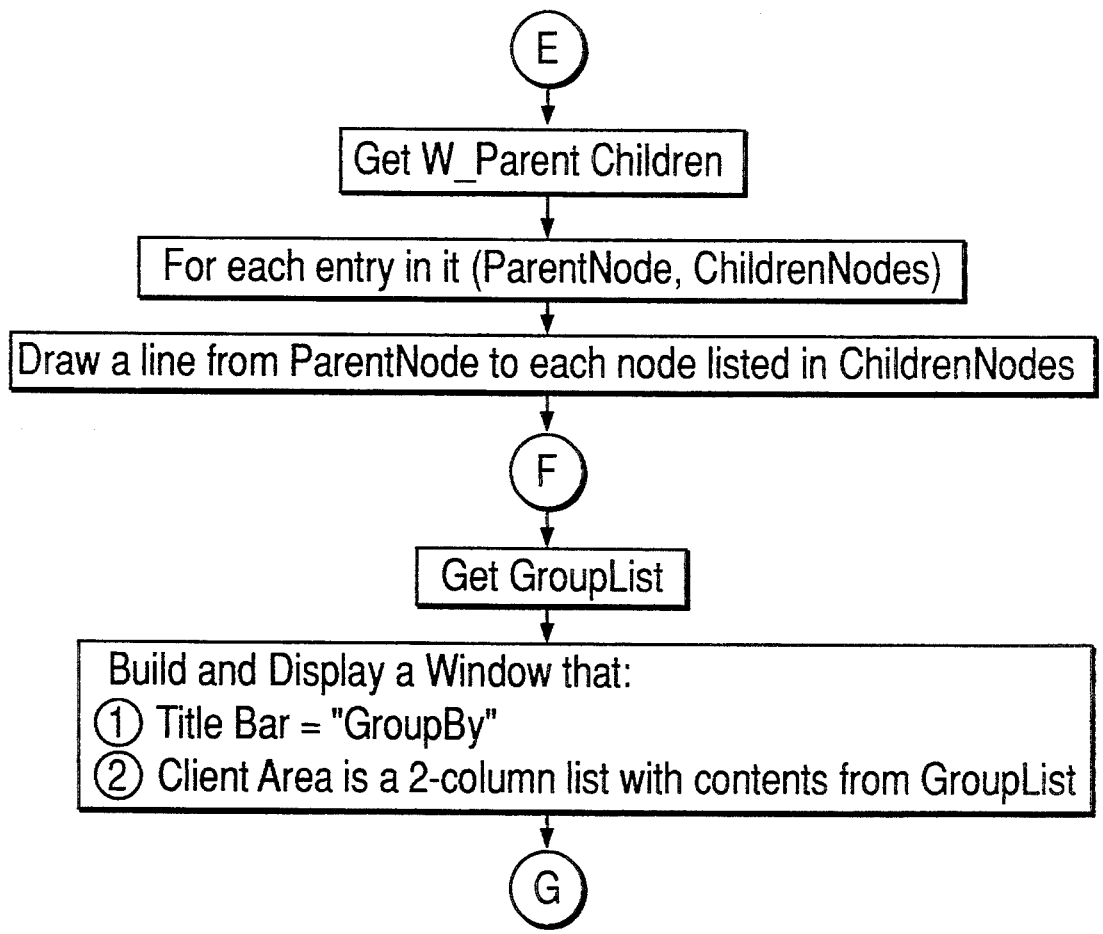
Figure 33:
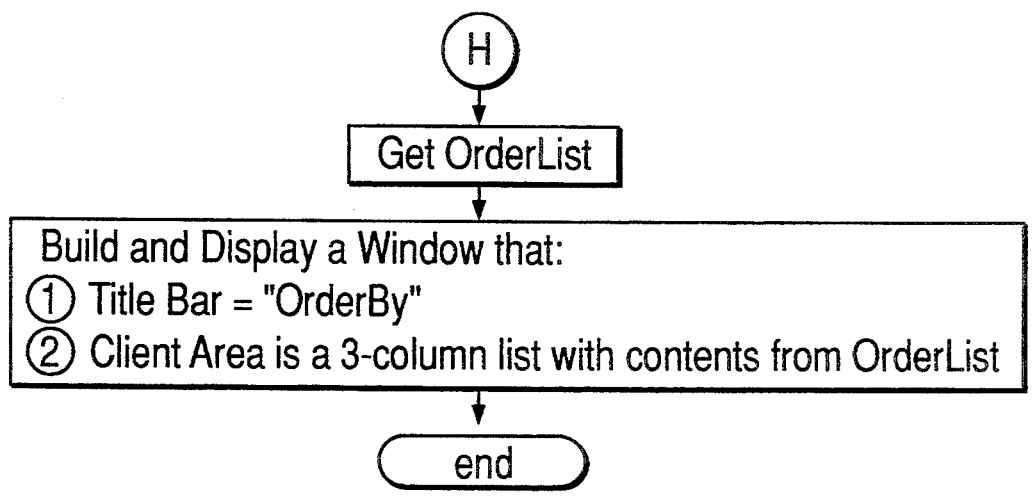
Figure 32:
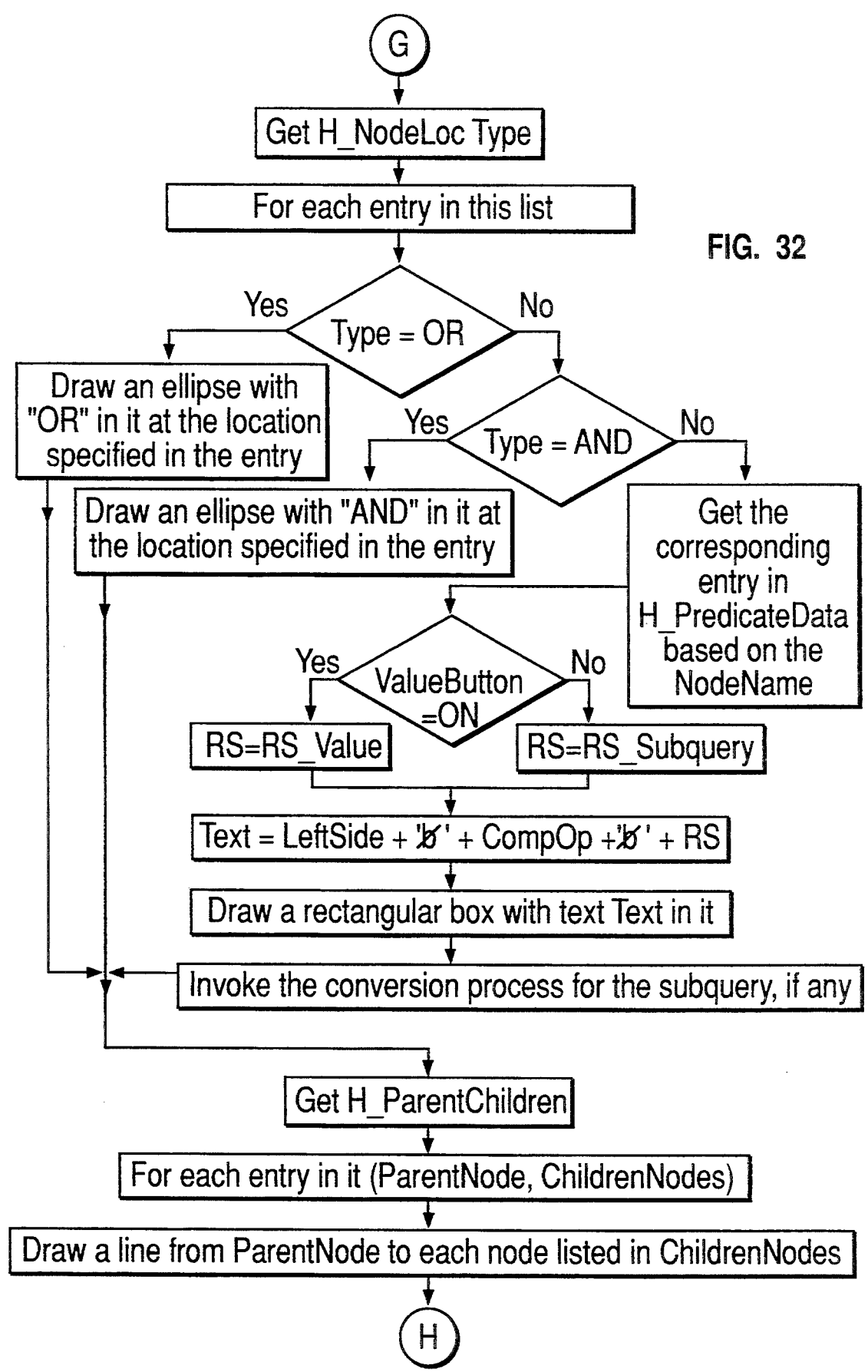
Figure 34:
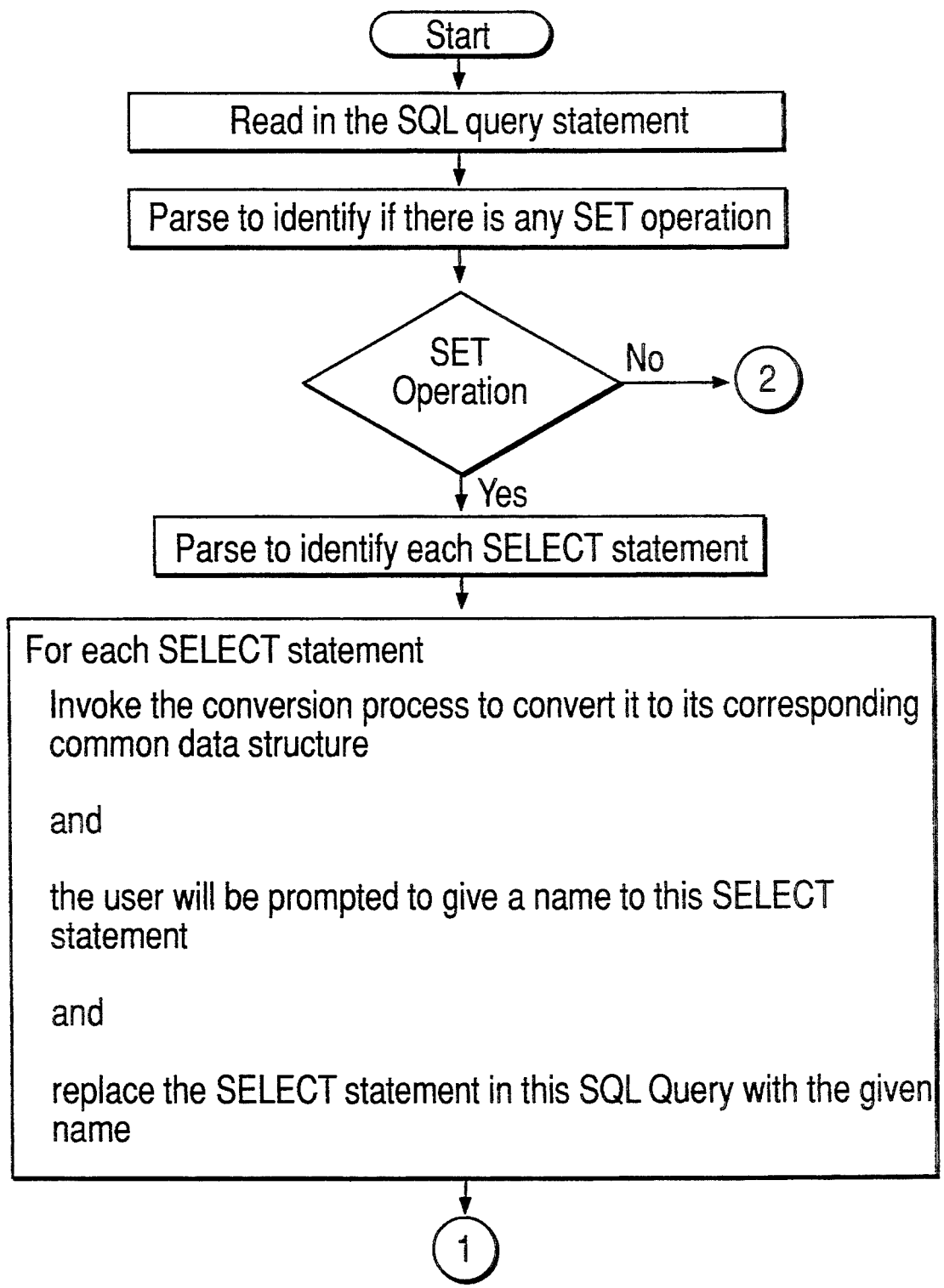
FIGS. 34-42 schematically depict by flow diagram the steps for converting an SQL query statement to a common data structure.

FIG. 2 illustrates a sample layout for a video display screen, such as screen 7 of workstation 1 in FIG. 1, to illustrate the content of a visually or graphically depicted query together with its SQL text equivalent. The SQL statement, generally in window 8, includes SELECT, FROM, WHERE, GROUP BY, HAVING and ORDER BY clauses, diverse logical relationships, mathematical relationships and subqueries. Note that most clauses and related tables are shown in independent windows. An example is the FROM clause in SQL window 8 which defines that the columns headed department (DEPT) and manager (MANAGER) are selected from independent tables respectively identified as staff (Staff) in window 9 and organization (ORG) in window 11. When new columns are defined in the SELECT clause, the columns are identified as being new by appropriate window. See window 12. A separate window also appears to identify that the GROUP BY clause relates a selected pair of columns from the potential sets defined by the interaction of the two tables. See window 13. Namely, columns DEPT and MANAGER are selected for grouping from the two tables Staff and ORG. Small window 14 is used to show that the distinct function has been disabled, thereby in conventional SQL methodology allowing redundancy in the rows selected for the response. No window is included to show that the answer has been defined to have an SQL ORDER BY requirement, namely, that the department listings be in ascending alphanumeric order.

The two windows at the bottom of the screen, 16 and 17, depict in graphical form the logical and mathematical relationships defined to satisfy the WHERE clause, a row condition, and the HAVING clause. The format of the Having Cond and Row Cond graphical depiction is the subject of the aforementioned copending patent application. With the preferred hardware and video display screen graphic environments defined, the ensuing description will focus on how one attains the desired method, system and program capabilities.

A central aspect of the invention was the recognition that bidirectional translation or conversion between text based SQL query statements and graphically based visual query representations requires the creation and use of a common data structure. As embodied, the common data structures is composed of multiple relatable lists. When the origin of the query is an SQL statement, the content of the lists for the common data structure is extracted by conventional parsing of the SQL statement. In the case a visual query, the data for the lists is captured and transformed into the common data structure during the graphical manipulation by the user.

The use of the common data structure provides a number of benefits. Paramount of those is the bidirectionality between the SQL query statement the visual representation of the query.

The common data structure described herein presumes an ANSI standard SQL language. However, and to the benefit of the user, the common data structure is amenable to additions as needed to cover SQL language variances. In part, this is attributable to the structured character of SQL, a language basically composed of distinguishable clauses.

For the preferred ANSI standard SQL embodiment described herein the data structures are composed of 8 elements. The composition of the structures as applied to the example query illustrated in FIG. 2 is depicted schematically by block diagram in FIG. 3. This SQL query establishes the following set of 8 basic data structures: (1) FromTable—an ordered list of tables from which data is to be queried, (2) SelectColumn—an ordered list of the column names which are included in the SelectClause, (3) SelectExp—an ordered list of expressions and column functions that are included in the SELECT clause, (4) WhereCond—the boolean expression in the WHERE clause, (5) GroupBy—an ordered list of column names which are in the GROUP BY clause, (6) HavingCond—the boolean expression in the HAVING clause, (7) OrderBy—the ordered list of (O_ColumnName, OrderOp) where OrderOp defines either an ASC (ascending) or a DSC (descending) order of listing and O_ColumnName is the column name specified in the Order By clause, and (8) DistinctFlag—the state of the DISTINCT key word.

To provide comprehensive bidirectionality between text format and visual representations of SQL queries, a preferred arrangement also includes an additional group of common data structures. The title of each such data structure, and its format, are set forth below.

(9) ColumnList—a data structure list for each table in the FromTable list. ColumnList contains a full list of the (ColumnName, Flag) data. The Flag data indicates if the ColumnName is selected for the SELECT clause. This list is readily constructed with system catalog information from the database management system.

(10) W_JoinList—this data structure comprises a list of (LeftSide, RightSide) that stores the "LeftSide equal to RightSide" information, where both LeftSide and RightSide are columns belonging to tables listed in FromTable. Each entry in this list is considered a Join condition for the query and as such is not included in the WHERE condition window.

(11) W_ParentChildren—this data structure is comprised of a list of (ParentNode, ChildrenNodes) where the ChildrenNodes are n-tuple consisting of the node names, which nodes are the children of the node specified in the ParentNode. For example, (N1, (N3, N4, N5)) represents that the node N3, N4 and N5 are the children nodes of node N1. This list is used for the WHERE condition.

(12) W_NodeLocType—this is a list of (NodeName, Coordinates, Type), where Coordinates are the coordinates of NodeName relative to the bottom left corner of the WHERE condition window, and Type indicates that NodeName is a logical operator (AND or OR) node or a predicate.

(13) W_PredicateData—this constitutes a list (NodeName, LeftSide, CompOp, ValueButton, RS_Value, SubqueryButton, RS_Subquery) which stores the information of the predicates in the WHERE condition. CompOp is the comparison operator. LeftSide is the expression left of the CompOp in the predicate. If ValueButton is in the ON state, the expression to the right of the CompOp in the predicate is merely a simple expression whose text is stored in RS_Value list. If the SubqueryButton is ON, the right side is treated as another SELECT statement, thus considered a subquery to the SQL query statement. The subquery is represented by a query name stored in the RS_Subquery list. The subquery is an individual query statement, in that it has its own data structure independent from the data structure query within which it resides.

(14) H_ParentChildren—a list similar to that of the W_ParentChildren, but for the HAVING condition.

(15) H_NodeLocType,—this list is similar to the W_NodeLocType but for the HAVING condition.

(16) H_PredicateData, a list is similar to the W_PredicateData, but for the HAVING condition.

(17) GroupList—a list of (ColumnName, GroupCheck) based upon the GroupBy structure. This list groups all the column names in ColumnList(I) for every Table(I) in the FromTable list. If a ColumnName entry also exists in the GroupBy list, the GroupCheck data is set ON. Otherwise, GroupCheck is set OFF.

(18) OrderList—this list is composed of (ColumnName, OrderOp, OrderNumber) and is based on the OrderBy structure. The list groups all the column names in ColumnList(I) from every Table(I) in the FromTable list. If a ColumnName entry also exists in the OrderBy list, the OrderNumber represents its position in the OrderBy list. Otherwise, the OrderNumber is left blank (null).

If the SQL language subject to bidirectional translation includes SET operations (UNION, INTERSECTION, EXCEPT), each query statement is treated as an individual query and a tree structure is used to represent the entire query. In the tree structure representation, the operator nodes are: UNION, UNION ALL, INTERSECT, INTERSECT ALL, EXCEPT, EXCEPT ALL, etc. In such a situation, the leaf nodes display the names for the query parts involved in the entire query. To implement this further SQL statement capability, three additional common data structures are needed.

(19) S—ParentChildren—this is a list of (ParentNode, ChildrenNodes) in which the ChildrenNodes is an n-tuple consisting of the node names which are children of the node specified in the ParentNode. For example, (N1, (N3, N4, N5)) represents that node N3, N4 and N5 are ChildNodes of node N1. This list is used with all queries having a SET operation.

(20) S—NodeLocType—this list is composed of (NodeName, Coordinates, Type) where Coordinates are the coordinates of NodeName relative to the bottom left corner of the query window, and Type indicates that NodeName is a SET operator (UNION, UNION ALL, INTERSECT, INTERSECT ALL, EXCEPT, EXCEPT ALL) node or a query.

(21) S—NodeQuery—this is a list composed of (NodeName, QueryName) which links the query names with names of the nodes in the tree structure representation. Each query is regarded as an individual query with independent data structure.

The foregoing lists are the core group of common data structures needed to implement conventional SQL language queries in a comprehensive bidirectional translation environment. For special queries, non-ANSI standard types, minor variations in the parsing rules and information may have to be added. In those cases where the input has a previously generated SQL statement, a preferred arrangement of the present invention includes a resource to detect nonstandard statements during the parsing operation. Once intercepted, nonstandard SQL statements can be manually translated by the user or, if the frequency dictates, can be the subject to automatic translation using extensions of the data structures defined herein.

It should also be recognized that the present invention provides resources to generate common data structures for incomplete queries. The ability to translate in increments is particularly valuable from the perspective of tracking the evolution of a query in its SQL and visual counterparts.

FIGS. 4-6 depict the organization of the tables and lists corresponding to the common data structures ColumnList, W—JoinList, W—ParentChildren, W—NodeLocType, W—PredicateData, H—ParentChildren, H—NodeLocType, H—PredicateData, GroupList and OrderList.

The data in the tables and lists of FIGS. 3-6 correspond to the information depicted in FIG. 2 by SQL statement and visual query equivalent.

FIG. 7 depicts the set of common data structures needed to implement the SET operations. Since the query example depicted in FIG. 2 does not include any SET relationships, the data in the tables is set to NULL.

Pseudocode, from which source code and related object code can be derived, suitable to practice the presently disclosed system, method and program is set forth in the ensuing text. The first block of pseudocode relates to the building of a common data structure from a visual query interface, as identified by heading comment. The corresponding set of flow diagrams for the translation between a visual query and the common data structure appears in the succession of FIGS. 8-27.

```
/* ******************************************* */
/* Build Common Data Structure from Visual Query */
/* Interface                                      */
/* ******************************************* */
/* A Table being selected */
TableSelectProc(STableName)
```

-continued

```
    Get STableName from the interface
    /* FromTable is a list */
    If STableName is in FromTable
        Return
    EndIf
    If FromTable is empty
        I = 0
    Else
        I = the Last Entry number of FromTable
    EndIf
    I = I + 1
    FromTable(I) = STableName
    /* Build ColumnList for TableName */
    /* Each entry of ColumnList is (ColumnName,
       Flag) */
    Get the names of columns belonged to STableName
        from System Catalog and build the ColumnList
        list for STableName with each Flag set to be OFF
    Determine the location on the screen to display a
        window that has STableName as its title bar and
        ColumnList as the contents of its client area
    Return
/* A Column displayed in a Table window being
   selected */
ColumnSelectProc(SColumnName)
    Change the display mode for SColumnName to be
        reverse video
    Find the TableName for this SColumnName
    Add TableName.SColumnName to the SelectColumn list
    Find the matched entry in ColumnList for TableName
    Set its Flag to be ON
    Return
/* A selected Table being deselected */
TableDeselectProc(DTableName)
    Remove DTableName from FromTable
    Remove the display of DTableName window
    For Each Entry (TableName.ColumnName) of
        SelectColumn Do
        If TableName = DTableName
            Get the ColumnList for DTableName
            If ColumnName exists in ColumnList for
                DTableName remove this entry from
                SelectColumn
            EndIf
        EndIf
    EndDo
    For Each Entry of ColumnList for DTableName Do
        Reset Flag to be OFF
    EndDo
    Get SelectExp
    For Each Entry (ExpFct) of SelectExp Do
        For Each ColumnName in ExpFct Do
            If ColumnName exists in ColumnList for
                DTableName remove this ExpFct from
                SelectExp
            EndIf
        EndDo
    EndDo
    Get WhereCond
    For Each Predicate in WhereCond Do
        For Each ColumnName in Predicate Do
            If ColumnName exists in ColumnList for
                DTableName remove this Predicate and its
                associated operator from Wherecond
            EndIf
        EndDo
    EndDo
    Get W—JoinList
    For Each Entry (TableName1.ColumnName1,
        TableName2.ColumnName2) of W—JoinList Do
        If TableName1=DTableName or
            TableName2=DTableName
            remove this Entry from W—JoinList
        EndIf
    EndDo
    Get GroupBy
    For Each Entry (GColumnName) of GroupBy Do
        If GColumnName exists in ColumnList for
            DTableName remove this Entry from GroupBy
        EndIf
    EndDo
    Get HavingCond
```

-continued

```
        For Each Predicate in HavingCond Do
            For Each ColumnName in Predicate Do
                If ColumnName exists in ColumnList for
                    DTableName remove this Predicate and its
                        associated operator from HavingCond
                EndIf
            EndDo
        EndDo
        Get OrderBy
        For Each Entry (O_ColumnName,OrderOp) of OrderBy Do
            If O_ColumnName exists in ColumnList for
                DTableName remove this Entry from OrderBy
            EndIf
        EndDo
        Reconstruct W_ParentChildren
        Reconstruct W_NodeLocType
        Reconstruct W_PredicateData
        Reconstruct GroupList
        Reconstruct H_ParentChildren
        Reconstruct R_NodeLocType
        Reconstruct H_PredicateData
        Reconstruct OrderList
        Redisplay the WhereCondition Window
        Redisplay the GroupBy Window
        Redisplay the HavingCondition Window
        Redisplay the OrderBy Window
        Redisplay the Visual Query Window with updated
            information
        Return
/* A selected Column displayed in a Table window being
    deselected */
ColumnDeselectProc(ColumnName)
    Change the display mode for ColumnName to be normal
    Find the TableName for this ColumnName
    Remove TableName.ColumnName to the SelectColumn
        List
    Find the matched entry in ColumnList for TableName
    Set its Flag to be OFF
    Return
/* A JOIN relationship being defined via direct
    manipulation */
JoinDefinedProc(ColumnName1, ColumnName2)
    Find the location for ColumnName1
    Find the location for ColumnName2
    Draw a line to connect the two locations
    Find the TableName1 for ColumnName1
    Find the TableName2 for ColumnName2
    Add (TableName1.ColumnName1,
        TableName2.ColumnName2) to W_JoinList
    Return
/* A JOIN relationship being deleted */
JoinDeleteProc(ColumnName1, ColumnName2)
    Find the location for ColumnName1
    Find the location for ColumnName2
    Erase the line that connects the two locations
    Find the TableName1 for ColumnName1
    Find the TableName2 for ColumnName2
    Remove (TableName1.ColumnName1,
        TableName2.ColumnName2) from W_JoinList
    Return
/* An expression or column function being defined */
ExpDefineProc(ExpFct)
    If SelectExp is empty
        Display the NewColumn Window
    Else
        Activate the NewColumn Window
    EndIf
    Add ExpFct to SelectExp
    Display ExpFct entry in reverse video
    Return
/* An expression or column function being deleted
ExpDeleteProc(ExpFct)
    Remove ExpFct from SelectExp
    If SelectExp is empty
        Remove the display of the NewColumn Window
        Activate the NewColumn Window
    EndIf
    Return
/* A column in the GroupByList Window being
    selected */
GroupColumnSelectProc(SColumnName)
    Change the display mode for SColumnName to reverse
        video
        Set its GroupCheck to be ON
        Return
/* A column in the GroupByList Window being
    deselected */
GroupColumnDeselectProc(DColumnName)
    Change the display mode for DColumnName to normal
    Set its GroupCheck to be OFF
    Return
/* A column in the OrderByList Window being
    selected */
GroupColumnSelectProc(SColumnName)
    Change the display mode for SColumnName to reverse
        video
    Update the OrderOp for SColumnName
    Readjust the Order in the OrderList
    Display the OrderByList Window in normal mode
    Return
/* A column in the OrderByList Window being
    deselected */
GroupColumnDeselectProc(DColumName)
    Change the display mode for DColumName to reverse
        video
    Display the OrderOp in grey
    Set its OrderNumber to NULL
    Readjust the Order in the OrderList
    Display the updated OrderByList in Normal mode
    Return
/* The process to define a predicate for WHERE       */
/* condition being invoked (e.g. by double           */
/* clicking on a column name in a table window)     */
WPredicateDefineProc( )
    Bring up the sub-process for the user to define a
        predicate
    If sub-process is committed
        Assign a new NodeName to this predicate
        Determine the location for this predicate in the
            WhereCondition Window
        Text = LeftSide + " " + " " CompOp + " " + RightSide
        Display Text in a rectangular box at the
            designated location
        Update W_PredicateData
        Update W_NodeLocType
    EndIf
    Return
/* The process to update a predicate for WHERE       */
/* condition being invoked (e.g. by double clicking  */
/* on a predicate box in the WhereCondition Window)  */
WPredicateUpdateProc(UNodeName)
    Get W_PredicateData
    Retrieve the LeftSide, CompOp, ValueButton,
        RS_Value, RS_Subquery
    Bring up the sub-process for the user to update a
        predicate with the original information as
        default
    If sub-process is committed
        If ValueButton is ON
            NewRightSide = Value
        Else
            NewRightSide = SubqueryName
            If SubqueryName is not defined
                Invoke the process allowing the user to
                    define SubqueryName
            EndIf
        EndIf
        Text = NewLeftSide + " " + NewCompOp + " " +
            NewRightSide
        Display Text in a rectangular box at its
            original location
        Update W_PredicateData
    EndIf
    Return
/* The process to modify or construct the tree       */
/* structure for the WHERE condition in the          */
/* WhereCondition Window being invoked               */
WhereTreeProc( )
    Update W_ParentChildren
    Update W_NodeLocType
    Update the display of WhereCondition Window
    Return
/* The process to define a predicate for HAVING      */
/* condition being invoked (e.g. by double           */
```

-continued

```
/*  clicking on a column name in a Table window)    */
HPredicateDefineProc( )
    Bring up the sub-process for the user to define a
        predicate
    If sub-process is committed
        Assign a new NodeName to this predicate
        Determine the location for this predicate in the
            HavingCondition Window
        Text = LeftSide + " " + CompOp + " " + RightSide
        Display Text in a rectangular box at the
            designated location
        Update H_PredicateData
        Update W_NodeLocType
    EndIf
    Return
/*  The process to update a predicate for HAVING    */
/*  condition being invoked (e.g. by double clicking */
/*  on a predicate box in the HavingCondition Window) */
*/
HPredicateUpdateProc(UNodeName)
    Get H_PredicateData
    Retrieve the LeftSide, CompOp, ValueButton,
        RS_Value, RS_Subquery
    Bring up the sub-process for the user to update a
        predicate with the original information as
        default
    If sub-process is committed
        If ValueButton is ON
            NewRightSide = Value
        Else
            NewRightSide = SubqueryName
            If SubqueryName is not defined
                Invoke the process allowing the user to
                    define SubqueryName
            EndIf
        EndIf
        Text = NewLeftSide + " " + NewCompOp + " " +
            NewRightSide
        Display Text in a rectangular box at its
            original location
        Update H_PredicateData
    EndIf
    Return
/*  The process to modify or construct the tree    */
/*  structure for the Having condition in the     */
/*  HavingCondition Window being invoked          */
HavingTreeProc( )
    Update H_ParentChildren
    Update H_NodeLocType
    Update the display of HavingCondition Window
    Return
/*  The process to define a query with SET    */
/*  operations being invoked                 */
SETQueryProc( )
    Invoke a new Visual Query Window for this query
        definition
    Invoke the process allowing the user to construct
        tree structure for this query:
        (1) Dragging query icons into this window
        (2) Defining SET operator nodes: UNION,
            INTERSECT, EXCEPT
        (3) Connecting SET operator nodes with each
            other
        (4) Connecting SET operator nodes with query
            icons
    Update S_ParentChildren
    Update S_NodeLocType
    Update S_NodeQuery
    Update the display of this Visual Query with SET
        operations
    Return
```

Pseudocode suitable to define the translation between the common data structure and the visual query equivalent is set forth below. The corresponding flow diagrams to practice such-operations are set forth in the succession of FIGS. 28–33.

```
/*  ****************************************  */
```

-continued

```
/*  Build Visual Query from its corresponding    */
/*  Common Data Structure                        */
/*  ****************************************   */
Get S_ParentChildren
If S_ParentChildren is not empty
    Get S_NodeQuery
    For Each QueryName Entry of S_NodeQuery Do
        Invoke the process to convert its corresponding
            common data structure to its Visual Query
            representation
    EndDo
    Get S_NodeLocType
    /*  Construct the tree structure representation  */
    /*  for this SELECT statement                    */
    For Each node specified in S_NodeLocType Do
        If Type is not query
            build an ellipse at Location with Type as
                text in the ellipse
        Else
            place the query icon at Location
        EndIf
    For Each Entry of S_ParentChildren Do
        Find the location of ParentNode from
            S_NodeLocType
        For Each ChildrenNode of this ParentNode
            Find the location of the ChildrenNode from
                S_NodeLocType build a line from ParentNode
                to ChildrenNode
        EndDo
    EndDo
    Display the tree structure representation
Else
    Call Procedure A
EndIf
/*  Procedure A  */
<Procedure A>
Get FromTable
For Each TableName in FromTable Do
    I = Current Entry position in FromTable
    Get ColumnList of TableName
    Build and Display a window with TableName as its
        title bar and ColumnList as the contents for its
        client area
    For each entry (ColumnName, Flag) of ColumnList Do
        If Flag = ON
            Highlight display the jth column in the
                window of TableName
        EndIf
    EndDo
EndDo
Get SelectExp
If SelectExp is not empty
    Build and display a window with "NewColumn" as its
        title bar and SelectExp as the contents of its
        client area and all entries are in highlight
        display
EndIf
Get W_JoinList
For Each (LeftSide,RightSide) Entry of W_JoinList Do
    Find the location of the column specified in
        LeftSide
    Find the location of the column specified in
        RightSide
    Draw a line to connect the two locations
EndDo
Get W_NodeLocType
Activate the WhereCondition Window
For Each Entry of W_NodeLocType Do
    If Type is not Predicate
        Draw an ellipse at Location with Type as its
            text
    Else
        Get the LeftSide, CompOp, ValueButton, RS_Value,
            RS_Subquery data from W_PredicateData
            belonged to NodeName
        If ValueButton = ON
            RS = RS_Value
        Else
            RS = RS_Subquery
            Invoke the conversion process for RS_Subquery
        EndIf
        Text = LeftSide+ " " +CompOp+" "+RS
```

```
        Draw a rectangular box at Location with Text as
            its text
        EndIf
EndDo
Get W_ParentChildren
For Each Entry of W_ParentChildren Do
    Find the location of ParentNode from W_NodeLocType
    For Each ChildrenNode of this ParentNode
        Find the location of the ChildrenNode from
            W_NodeLocType
        Draw a line from ParentNode to ChildrenNode
    EndDo
EndDo
Get GroupList
Build and Display a window with "GroupBy" as its title
    bar and GroupList (a 2-column list) as the contents
    of its client area
Get R_NodeLocType
Activate the HavingCondition Window
For Each Entry of H_NodeLocType Do
    If Type is not Predicate
        Draw an ellipse at Location with Type as its
            text
    Else
        Get the LeftSide, CompOp, ValueButton, RS_Value,
            RS_Subquery data from H_PredicateData
            belonged to NodeName
        If ValueButton = ON
            RS = RS_Value
        Else
            RS = RS_Subquery
            Invoke the conversion process for RS_Subquery
        EndIf
        Text = LeftSide+' '+CompOp+" "+RS
        Draw a rectangular box at Location with Text as
            its text
    EndIf
EndDo
Get H_ParentChildren
For Each Entry of H_ParentChildren Do
    Find the location of ParentNode from U_NodeLocType
    For Each ChildrenNode of this ParentNode
        Find the location of the ChildrenNode from
            H_NodeLocType
        Draw a line from ParentNode to ChildrenNode
    EndDo
EndDo
Get OrderList
Build and display a window with "OrderBy" as its title
    bar and OrderList (a 3-column list) as the contents
    of its client area
Return
```

Pseudocode for deriving the translation between an SQL query statement and the common data structure is set forth below and presented by a flow diagram in the succession of FIGS. 34–42.

```
/* **************************************************** */
/* Build the Common Data Structure from SQL Query       */
/* statement                                             */
/* **************************************************** */
Read in the SQL query statement
Parse to identify SET operators
If exists any SET operator
    Parse to identify each SELECT statement
    For Each SELECT Statement Do
        Invoke the conversion process to build its
            common data structure
        The user supplies a name to this SELECT
            statement
        Replace the SELECT statement in this SQL query
            statement with the user-supplied name
    EndDo
    Build the Boolean factor tree structure for the
        converted SQL statement with UNION, INTERSECT,
        EXCEPT as operator nodes and each SELECT name as
        a leave node
    For Each Operator Node of the boolean factor tree
        starting from lowest level Do
        If it is equivalent to its parent node
            Merge this node with its parent node
        EndIf
        Move to next Operator Node
    EndDo
    Build S_ParentChildren
    Build S_NodeLocType
    Build S_NodeQuery
Else
    Parse the SQL query statement to identify:
        SelectClause, FromClause, GroupClause,
        HavingClause, OrderClause
    Parse the FromClause to identify each TableName
    Build FromTable list by adding each TableName as an
        entry of FromTable
    For Each Entry (TableName) of FromTable Do
        Retrieve names of columns belonged to TableName
            from System Catalog of the Database
            Management System
        Build the ColumnList, a list of (ColumnName,
            Flag), for TableName with all entries of Flag
            set to be OFF
    EndDo
    Parse the SelectClause to identify each token
    For each token Do
        If it is a single column name
            For Each Entry (TableName) of FromTable Do
                For Each Entry (ColumnName,Flag) of
                    ColumnList for TableName
                    If token = ColumnName
                        set its Flag = ON
                        Found = yes
                        Jump out this loop
                    EndIf
                    Move to next Entry
                EndDo
                If Found = yes
                    Add (TableName.ColumnName) to
                        SelectColumn List
                    Jump out this loop
                EndIf
                Move to next Entry
            EndDo
            If Found is not yes
                Error
                Stop
            EndIf
        Else
            Add this token to SelectExp list
        EndIf
    EndDo
    Parse the WhereClause to build a boolean factor tree
        with AND, OR as operator node
    For Each predicate in WhereClause Do
        If there exists SELECT statement in this predicate
            Identify the SELECT statement
            The user supplies a name to it
            Replace the SELECT statement in the predicate
                with its given name
            Invoke the conversion process to build the
                common data structure for this SELECT
                statement
        EndIf
    EndDo
    For Each Operator Node of the boolean factor tree for
        WhereClause starting from lowest level Do
        If it is equivalent to its parent node
            Merge this node with its parent node
        EndIf
        Move to next Operator Node
    EndDo
    If the Root node in the converted tree structure for
        WhereClause is AND
        For Each ChildNode of the Root Do
            If ChildNode is a predicate and its CompOp is
                "=" and both sides are single columns from
                different tables
                Remove this predicate node from the tree
                    structure
                Add the (LeftSide,RightSide) from this
                    predicate to W_JoinList list
```

```
                EndIf
            EndDo
        EndIf
    Build W_ParentChildren based on the final converted
        tree
    Build W_NodeLocType based on the final converted tree
    Build W_PredicateData based on the final converted
        tree
    Parse the GroupClause to identify each G-ColumnName
    Build the GroupBy list by adding each G-ColumnName as
        an entry
    For Each Entry (TableName) of FromTable Do
        Get ColumnList of TableName
        For Each Entry (ColumnName, Flag) of ColumnList
            Do
                If ColumnName exists in GroupBy list
                    Add (ColumnName, ON) to GroupList
                Else
                    Add (ColumnName, OFF) to GroupList
                EndIf
        EndDo
    EndDo
    Parse the HavingClause to build boolean factor tree
        with AND, OR as operator nodes and predicates as
        leave nodes
    For Each predicate in HavingClause Do
        If there exists SELECT statement in this predicate
            Identify the SELECT statement
            The user supplies a name to it
            Replace the SELECT statement in the predicate
                with its given name
            Invoke the conversion process to build the
                common data structure for this SELECT
                statement
        EndIf
    EndDo
    For Each Operator Node of the boolean factor tree of
        HavingClause starting from lowest level Do
            If it is equivalent to its parent node
                Merge this node with its parent node
            EndIf
            Move to next Operator Node
    EndDo
    Build H_ParentChildren based on the final converted
        tree
    Build H_NodeLocType based on the final converted tree
    Build H_PredicateData based on the final converted
        tree
    Parse the OrderClause to identify where OrderOp is
        either ASC or DSC
    Build OrderBy list by adding each (O_ColumnName,
        OrderOp) as an entry
    For Each Entry (TableName) of FromTable Do
        Get ColumnList of TableName
        For Each Entry (ColumnName, Flag) of ColumnList Do
            For Each Entry (O_ColumnName, OrderOp) of
                OrderBy Do
                If ColumnName=O_ColumnName
                    I = the entry number in OrderBy list
                    Add (ColumnName, OrderOp, I) to OrderList
                Else
                    Add (ColumnName, null, null) to OrderList
                EndIf
            EndDo
        EndDo
    EndDo
EndIf
End
```

Figure 43:
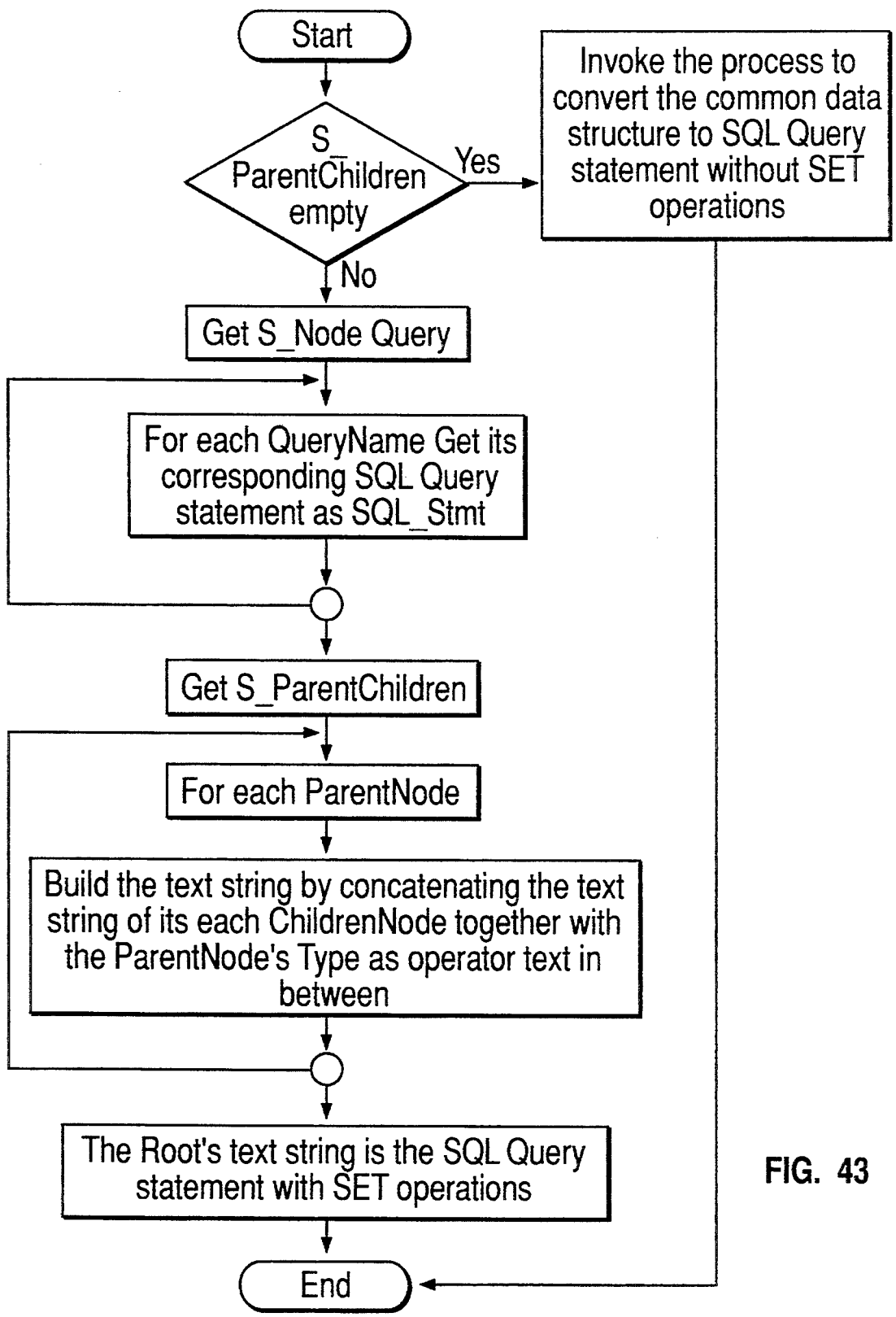
FIG. 43 schematically depicts by flow diagram the steps for converting a common data structure to an SQL query statement with set operations.
Figure 44:
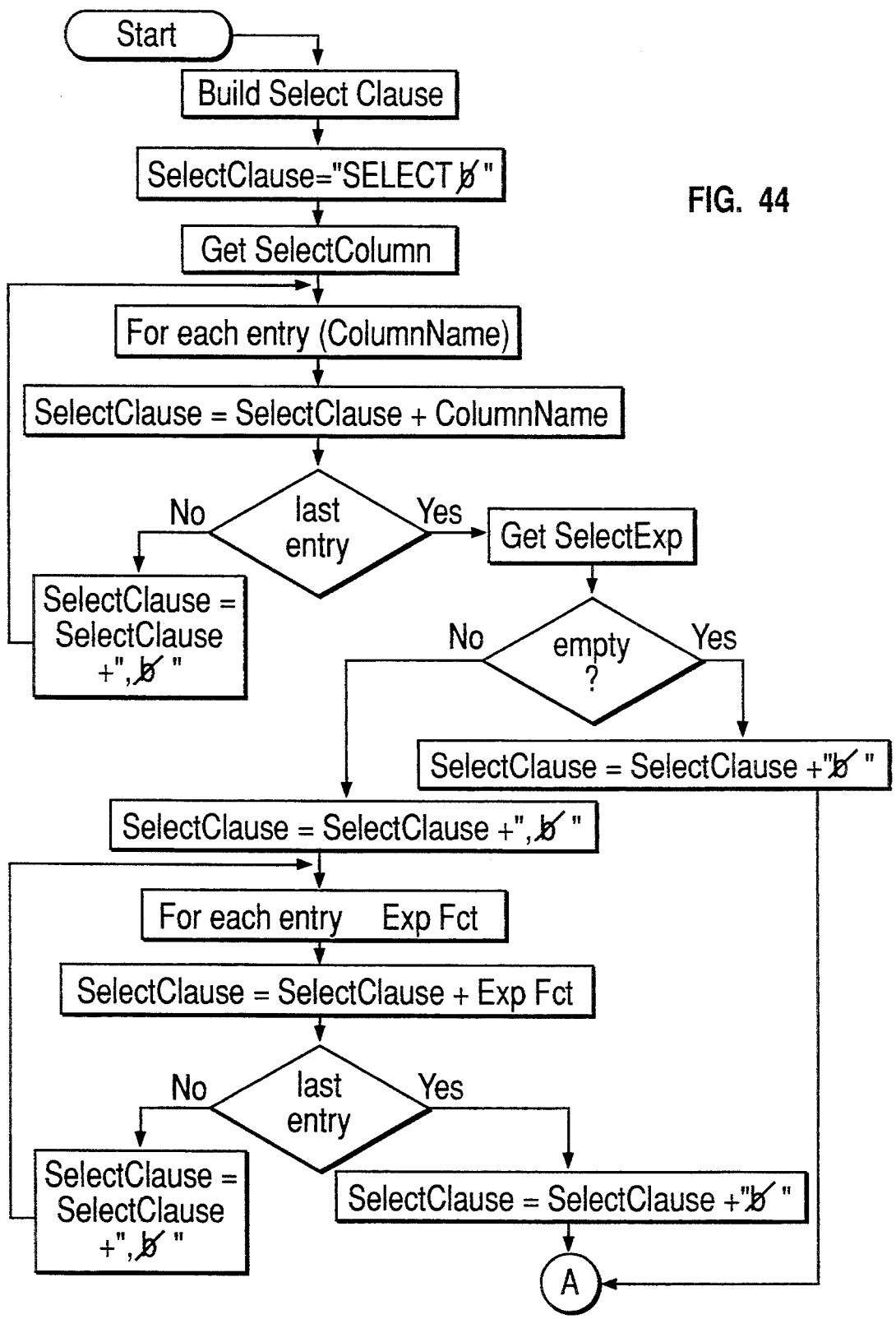
Figure 45:
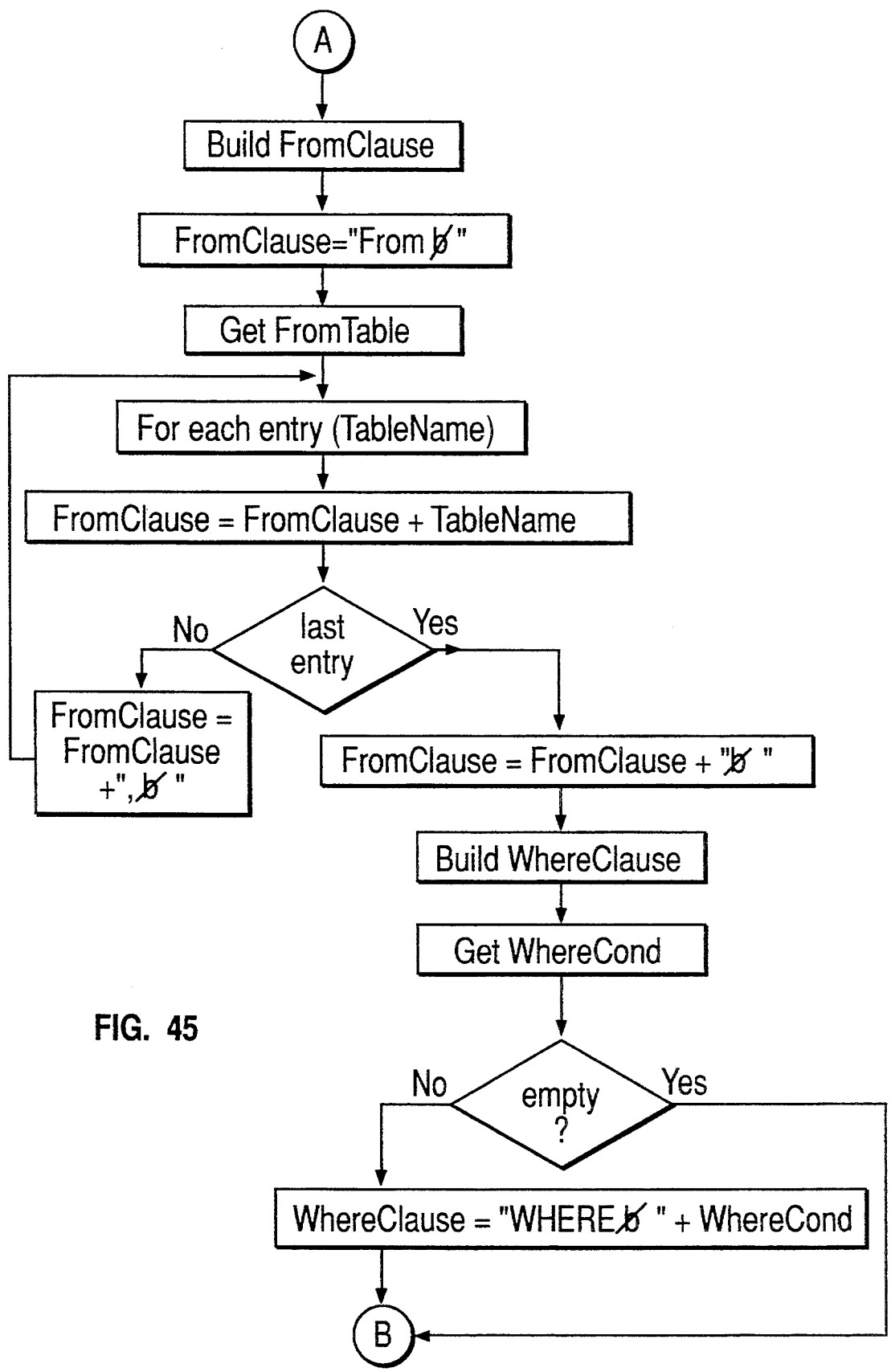
Figure 46:
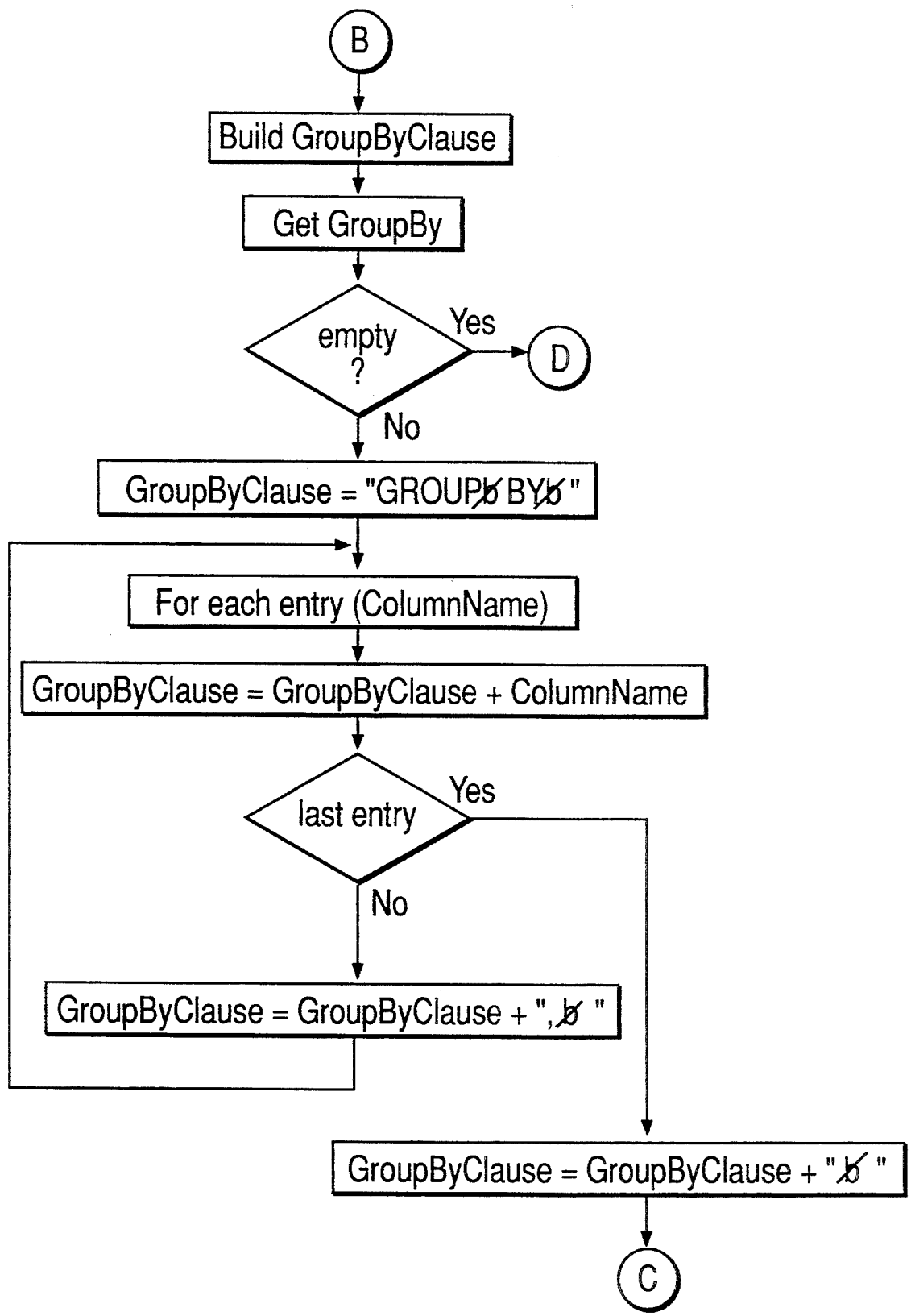
Figure 47:
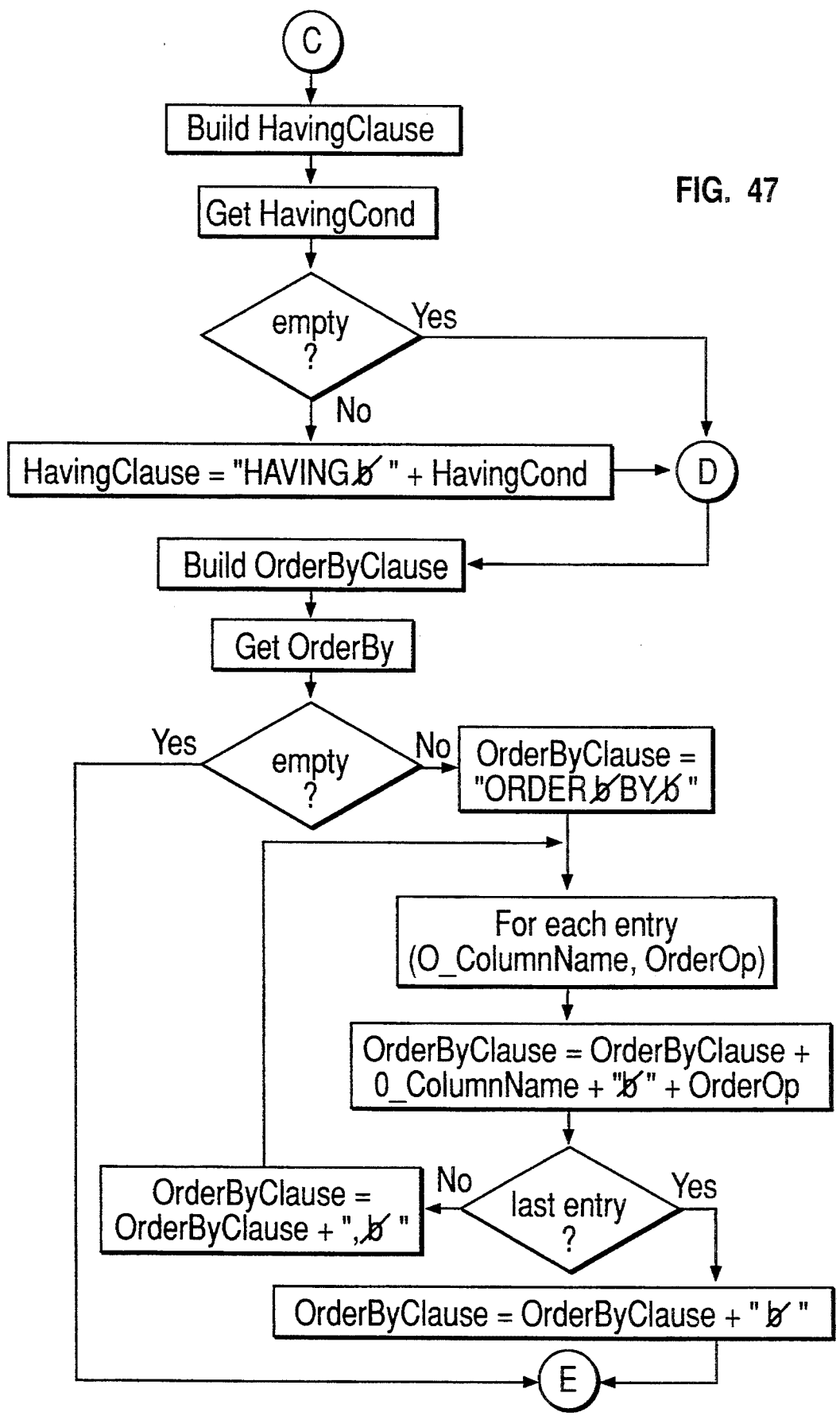

Pseudocode for translating back from the common data structure to the SQL query statement with SET operations is set forth in the ensuing code and presented by flow diagram in FIG. 43.

```
/*  ********************************************  */
/*  Build SQL Query Statement with SET operations  */
/*  from the Common Data Structure                 */
/*  ********************************************  */
Get S_ParentChildren
If S_ParentChildren is not empty
    Get S_NodeQuery
    For Each Entry of S_NodeQuery Do
        Invoke the process to build SQL statement for
            QueryName based on its corresponding common
            data structure
    EndDo
    For Each Entry of S_ParentChildren Do
        Get S_NodeLocType
        OP = the ParentNode's Type in S_NodeLocType
        For Each ChildrenNode of this Entry in
            S_ParentChildren Do
                Build and Get the text string of SQL for
                    this ChildrenNode
        EndDo
        Concatenate the text string of each ChildrenNode
            together by using OP in between to build the
            SQL text string for this ParentNode
    EndDo
    SQL_Statement is the ROOT's SQL text string
Else
    Invoke the process to convert the common data
        structure to its corresponding SQL query statement
        without SET operations
EndIf
```

Pseudocode suitable to translate from the common data structure to an SQL query without the SET operations is set forth below. The corresponding flow diagrams are schematically depicted in this succession of FIGS. 44-48.

```
/*  ********************************************  */
/*  Build a SQL query statement without SET        */
/*  operations from the Common Data Structure      */
/*  ********************************************  */
SelectClause
SelectClause = "SELECT "
Get SelectColumn
Do While NOT (Last Entry) of SelectColumn
    SelectClause = SelectClause + ColumnName + ", "
    Move to Next Entry
EndDo
SelectClause = SelectClause + ColumnName
Get SelectExp
If SelectExp is not empty
    SelectClause = SelectClause + ", "
    Do While NOT (Last Entry) of SelectExp
        SelectClause = SelectClause + ExpFct + ", "
        Move to Next Entry
    EndDo
    SelectClause + SelectClause + ExpFct + " "
Else
    SelectClause = SelectClause + " "
Endif
/*  FromClause  */
FromClause = "FROM "
Get FromTable
Do While NOT (Last Entry) of FromTable
    FromClause + FromClause + TableName + ", "
    Move to Next Entry
EndDo
FromClause = FromClause + " "
/*  Where Clause  */
Get WhereCond
If WhereCond is not empty
    WhereClause = "WHERE " + WhereCond
Else
    WhereClause = " "
Endif
/*  GroupByClause  */
Get GroupBy
If GroupBy is not empty
    GroupByClause = "GROUP BY "
    Do While NOT (Last Entry) of GroupBy
        GroupByClause = GroupByClause + ColumnName +
            ", "
        Move to Next Entry
    EndDo
    GroupByClause = GroupByClause + ColumnName + " "
```

```
                    -continued
/* HavingClause */
Get HavingCond
    If HavingCond is not empty
        HavingClause = "HAVING" + Having Cond
    Endif
Else
    GroupByClause = " "
    HavingClause = " "
Endif
/* OrdeClause */
Get OrderBy
If OrderBy is not empty
    OrderByClause = "ORDER BY "
    Do While NOT (Last Entry) of OrderBy
        OrderByClause = OrderByClause+O_ColumnName+"
            "+OrderOp+", "
        Move to Next Entry
    EndDo
    OrderByClause = OrderByClause+O_ColumnName+"
        "+OrderOp+" "
Else
    OrderByClause = " "
Endif
/* SQL Statement */
SQL_Statement =   SelectClause + FromClause +
                  WhereClause + GroupByClause +
                  HavingClause + OrderByClause
```

Figure 35:
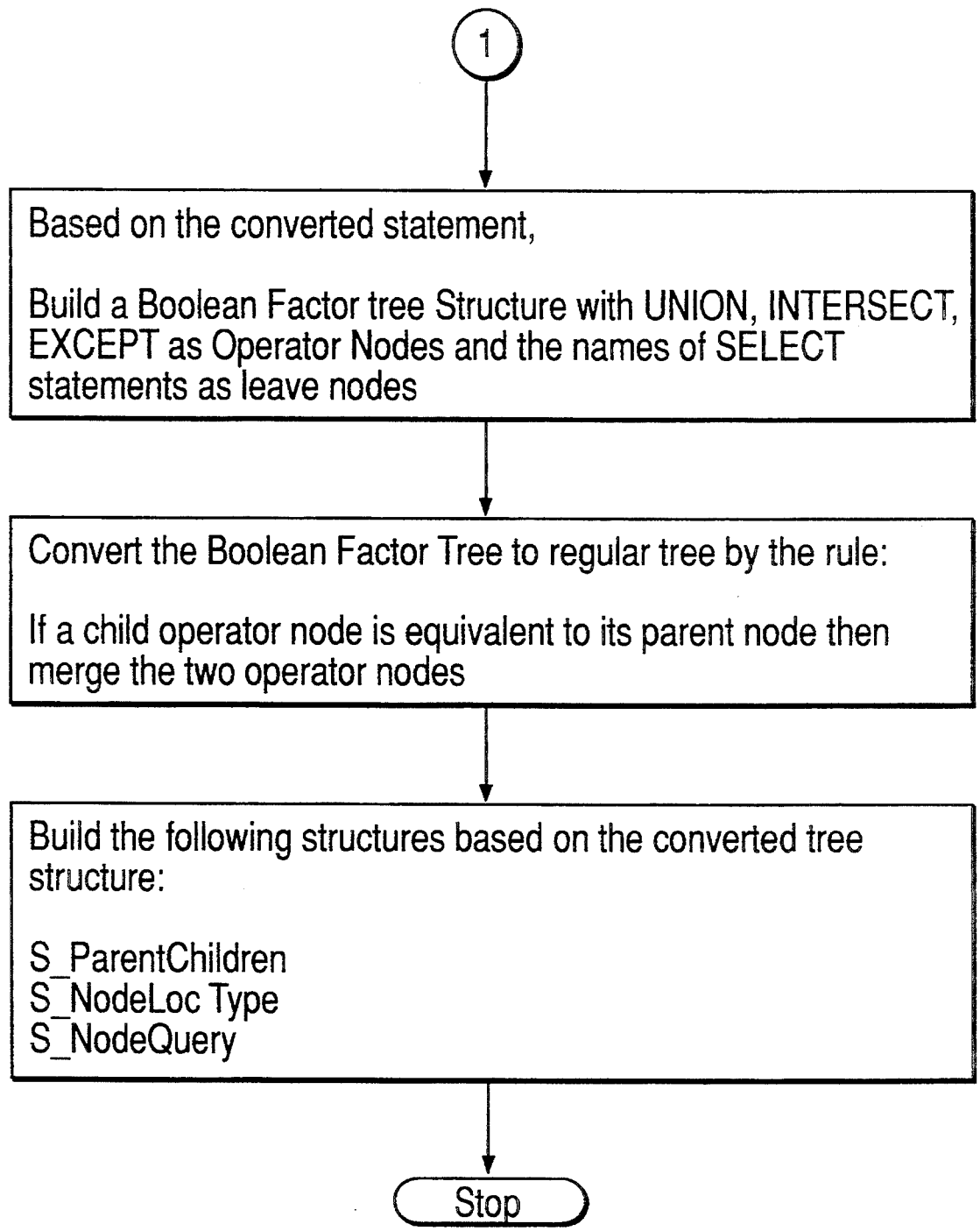
Figure 36:
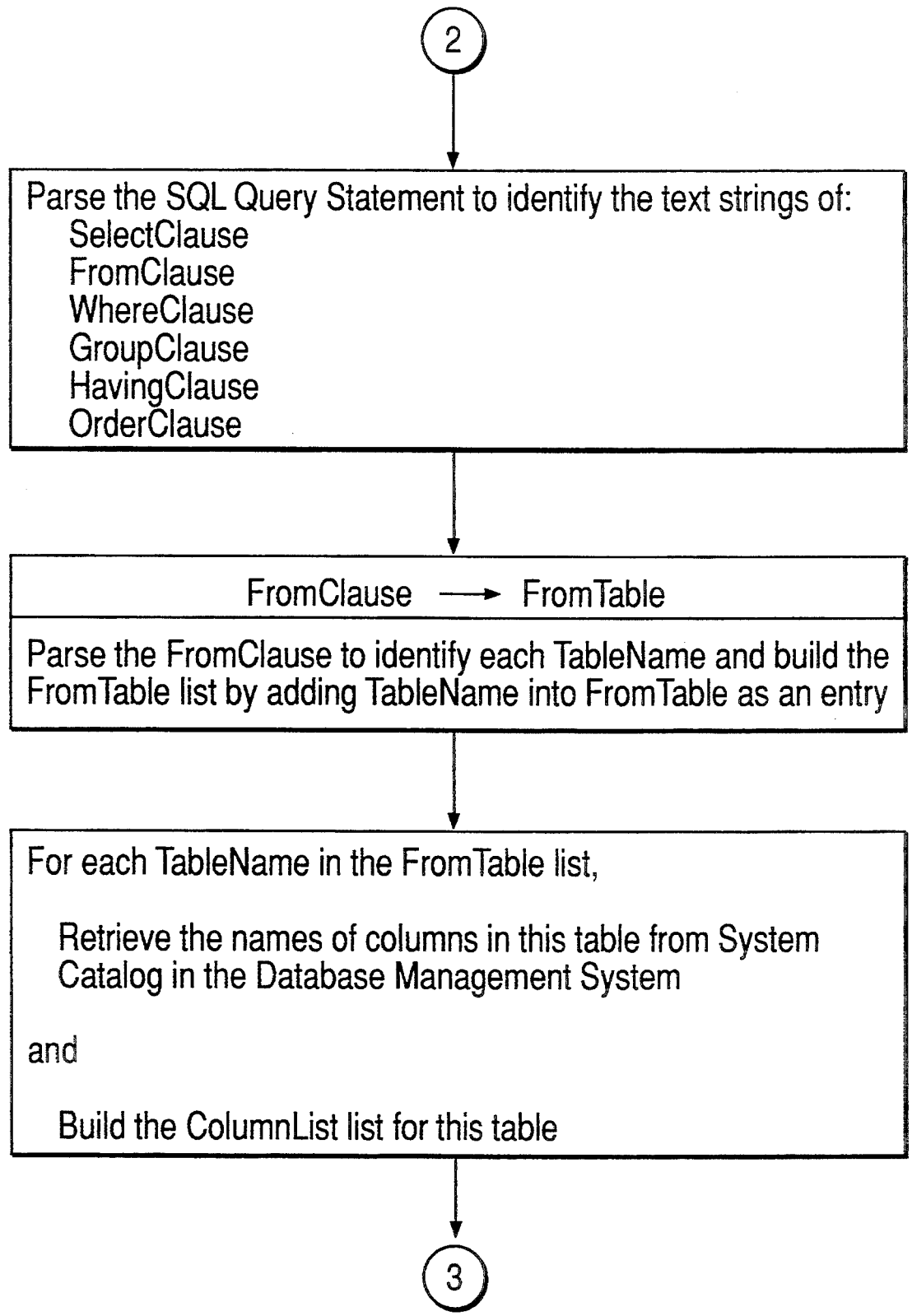
Figure 37:
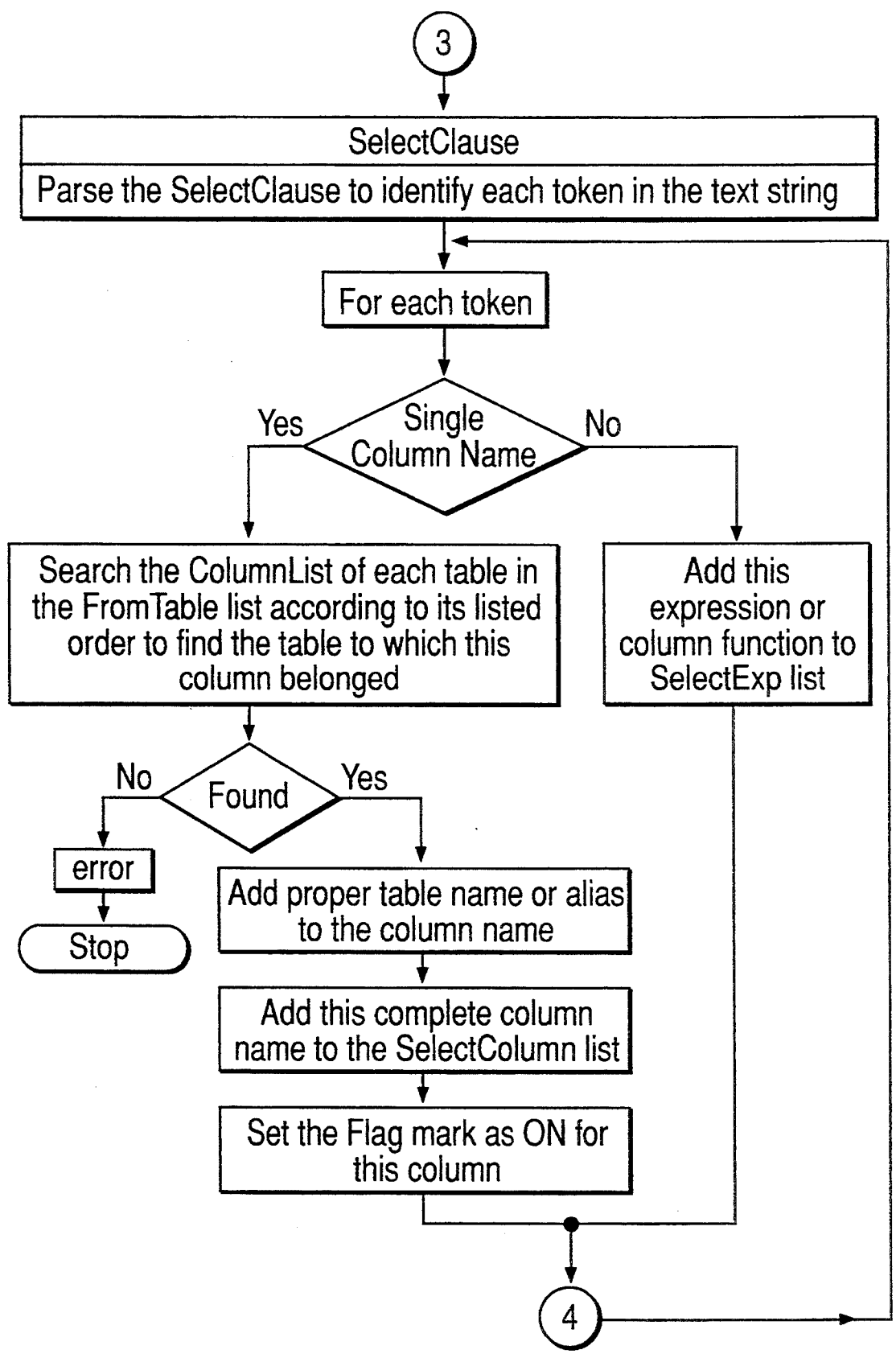
Figure 38:
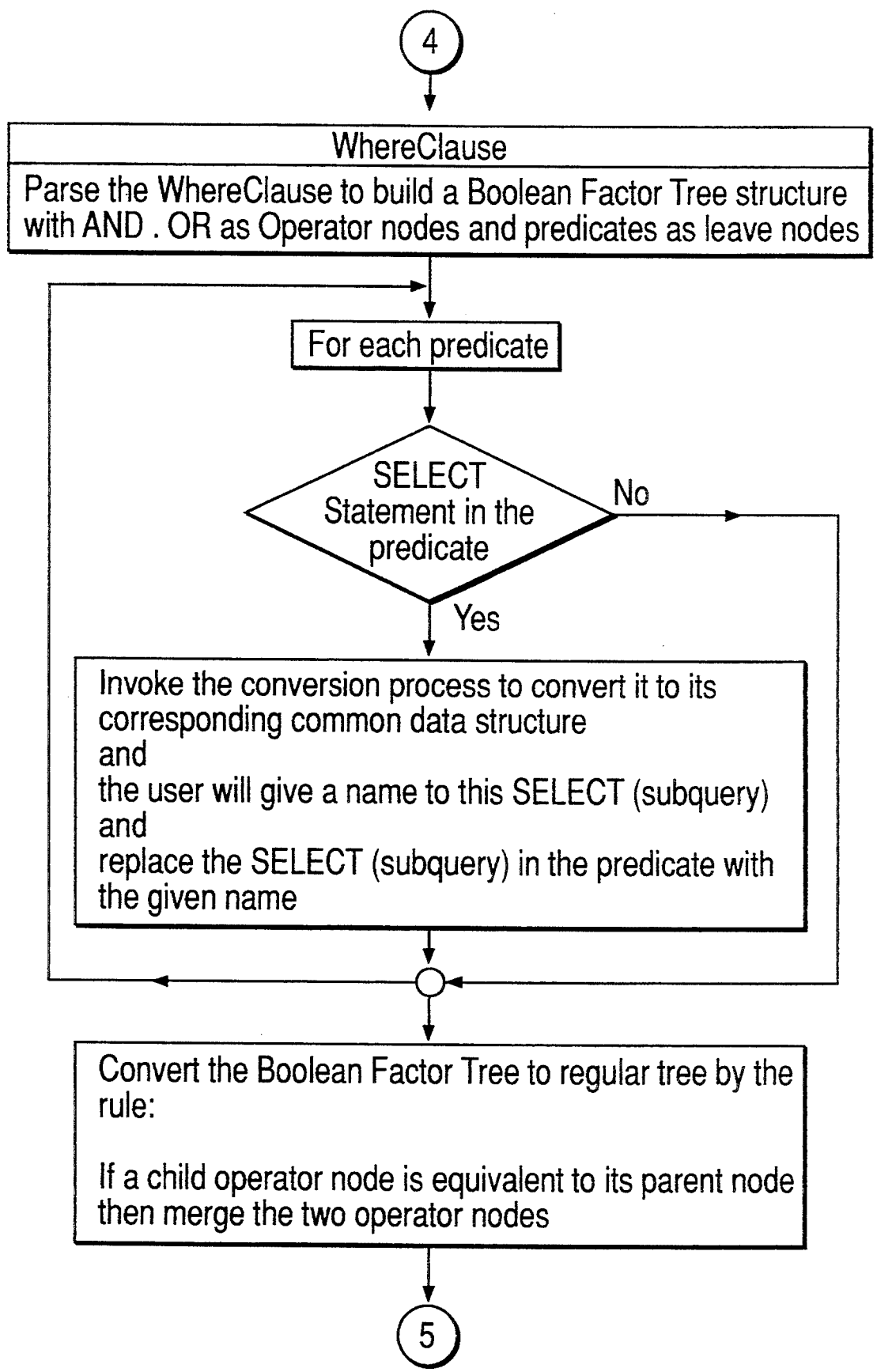
Figure 39:
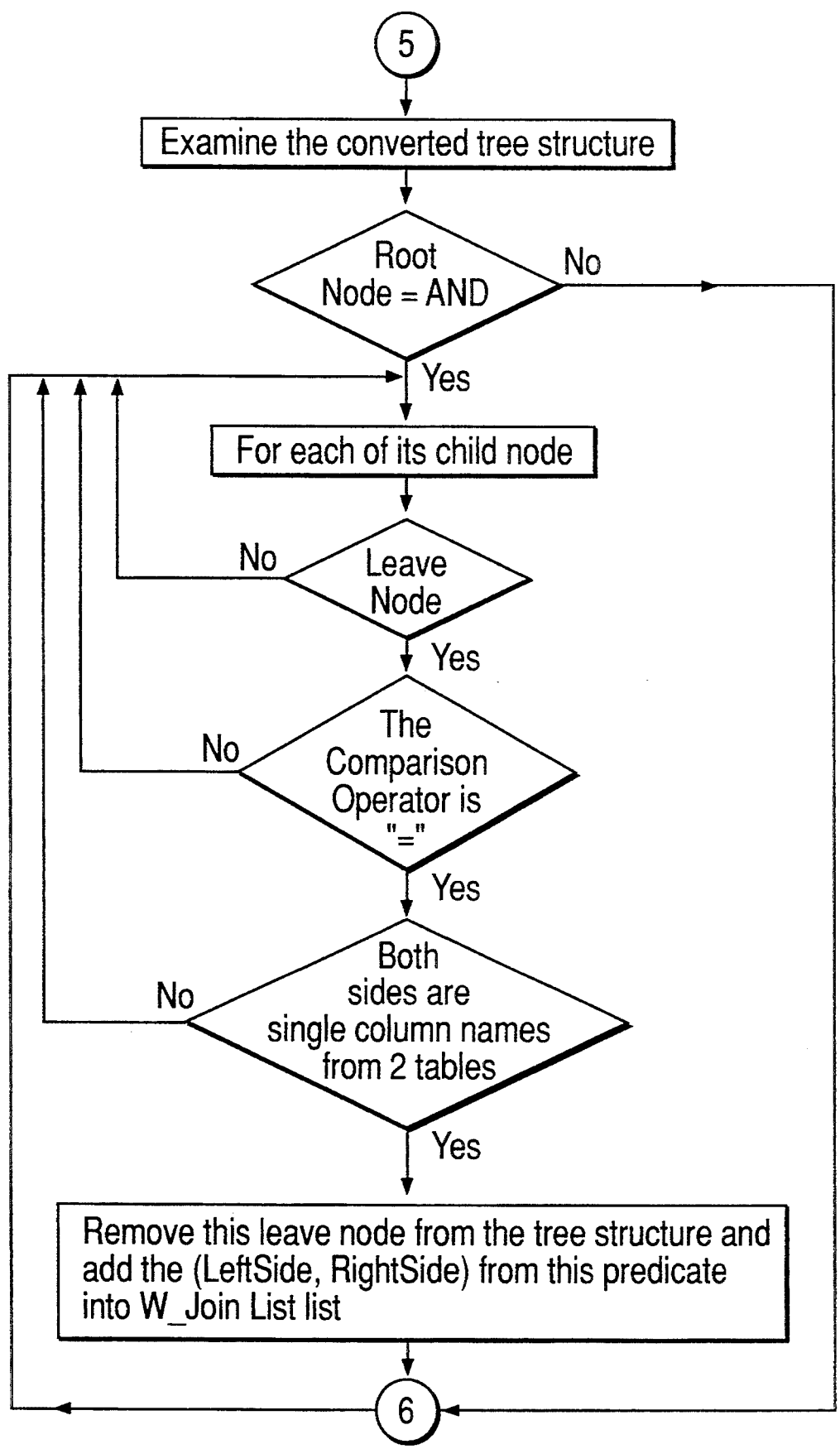
Figure 40:
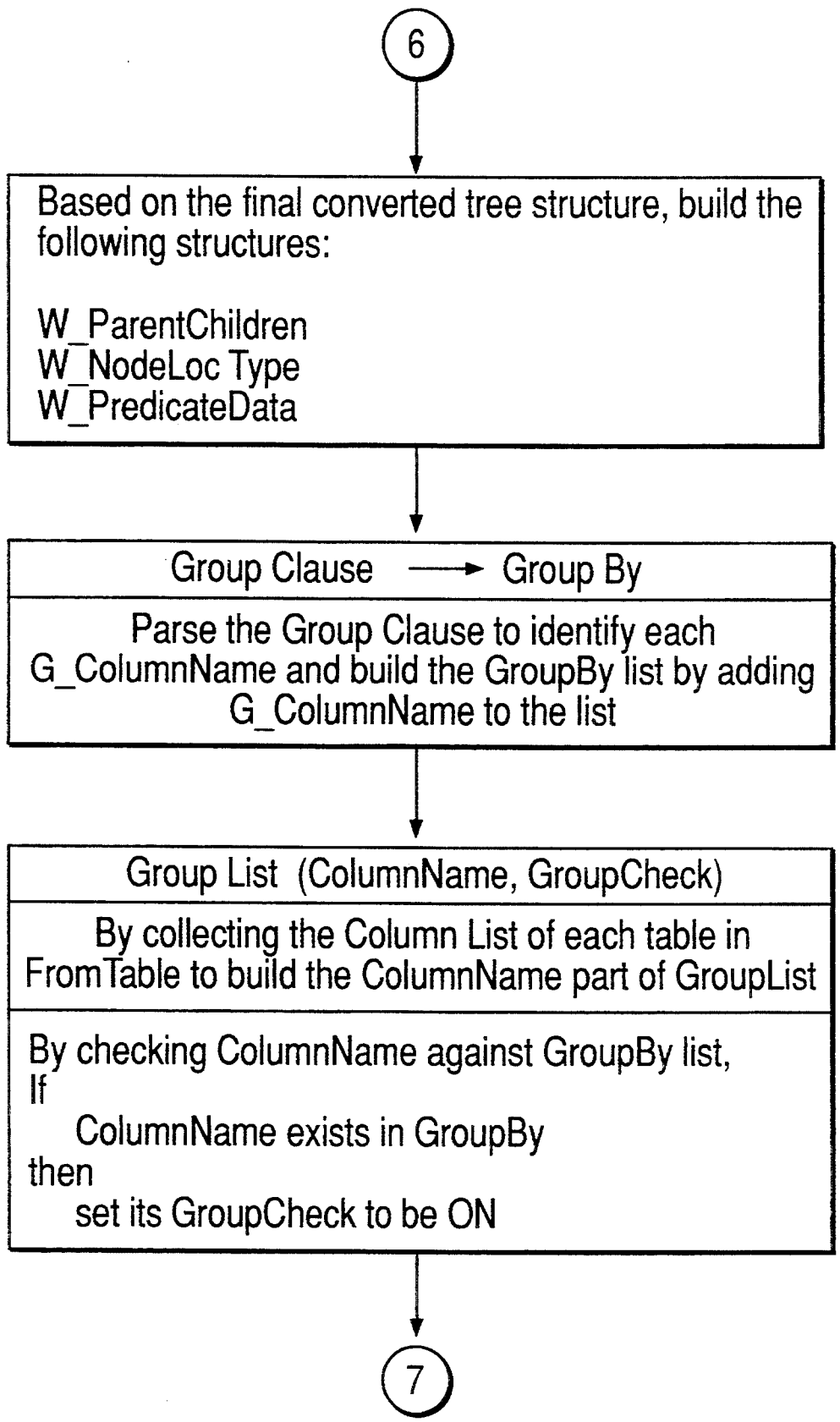
Figure 41:
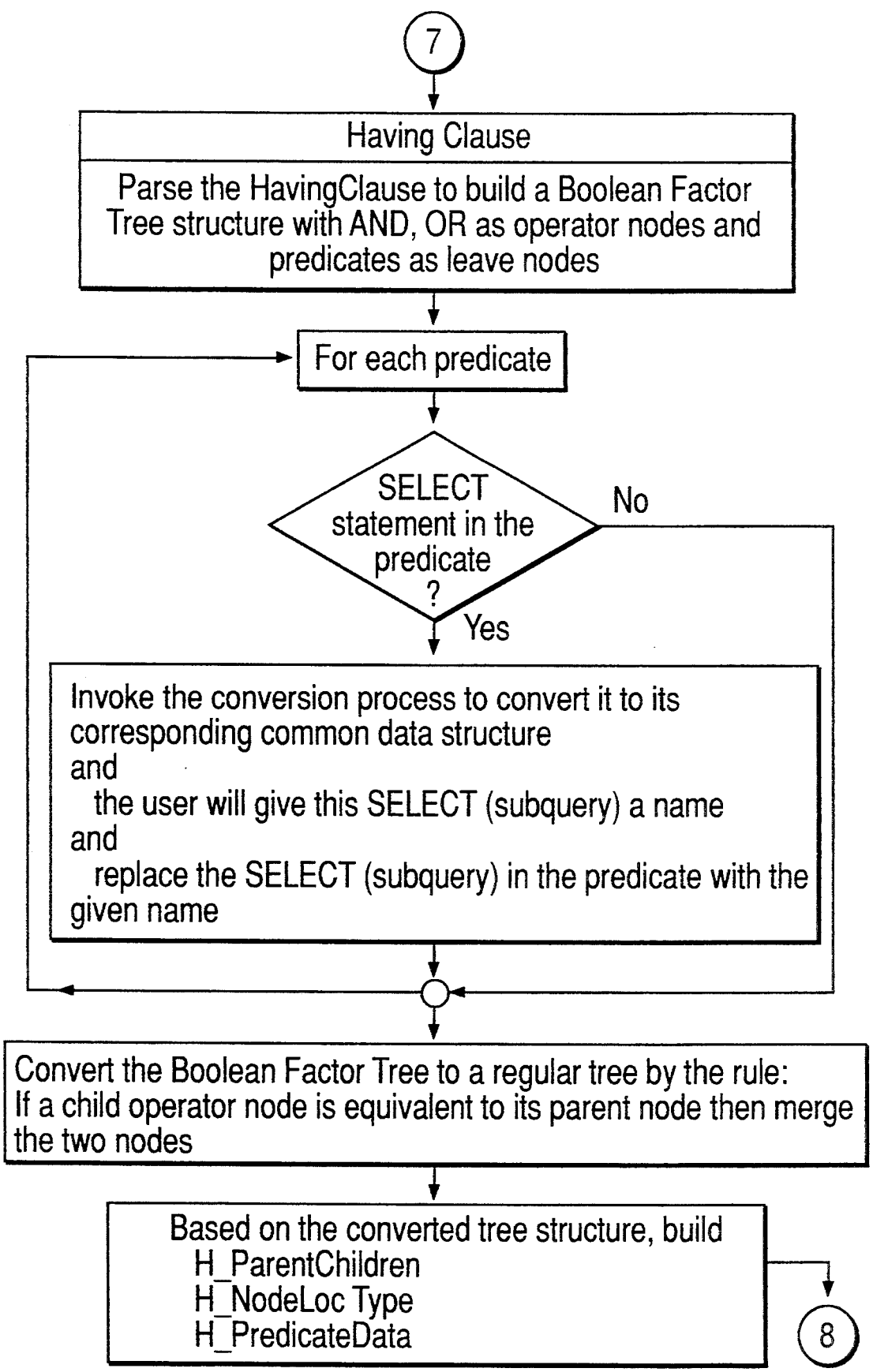
Figure 42:
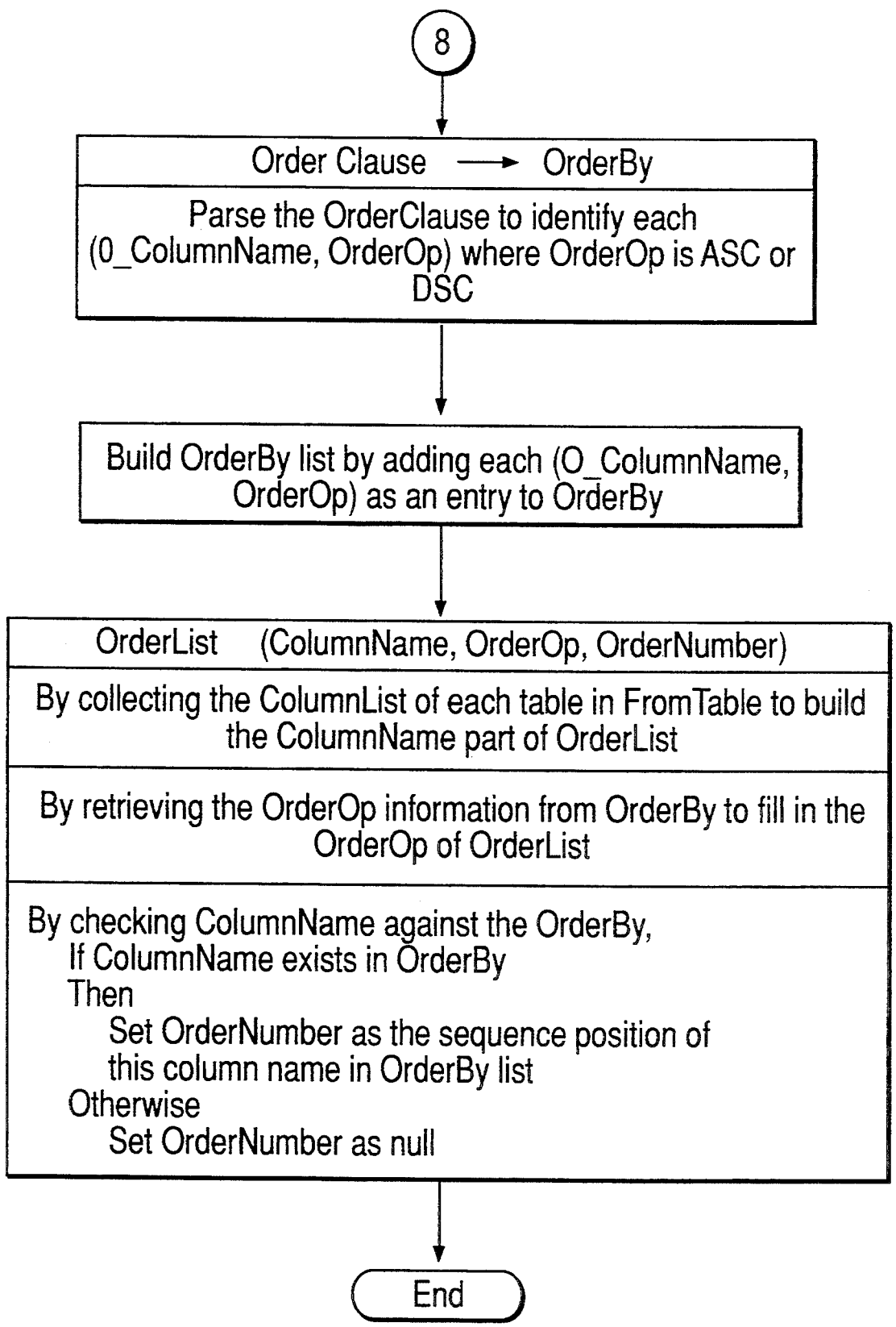

The creation of a Boolean factor tree as described in the flow diagrams of FIGS. 35, 38 and 41, is preferably accomplished by following the procedures described in the aforementioned article entitled, "Method of Detecting Atomic Boolean Factors", as appeared on pages 368–374 of the *IBM Technical Disclosure Bulletin*, Vol. 32, No. 5B, October, 1989. Other methods of parsing the SQL statement to create Boolean factor trees are also known and equally viable to accomplish these increments in the flow of the operation for translating an SQL statement into a common data structure.

Particular relevance should be given to the fact that the present apparatus, method and program for converting is both bidirectional and comprehensive. The bidirectionality is particularly important from the perspective of migrating libraries of existing SQL queries. The comprehensiveness eases such migration through the ability to handle diverse logical and mathematical relationships in the clauses, such as the WHERE clause, together with the ability to fully handle subqueries. The implications of subqueries were a particular problem for previously known approaches. The ability to translate from SQL to visual representation is distinctly unique, combining the parsing of SQL clauses, the translation into a common date structure, and the eventual translation into both graphical blocks and the links relating the windowed data.

The visual representation of a query by windows, as set forth in FIG. 2, is preferred from the perspective of user friendliness. In a preferred context, a window is allocated for each table in the FROM statement, and contains therein a list of the column names. The columns names subject to the SELECT statement are highlighted in the table windows. A NewColumn window is used to identify user defined expressions in the SELECT clause. WHERE clauses for relating predicates joined by AND and OR logic are shown by tree representation in separate windows, such as the depicted Row Cond window. GROUP BY statements are shown in a separate window, with the selected columns identified. A HAVING condition window, such as appears in FIG. 2, also contains a tree representation of the statement logic. An ORDER BY clause could also be added as a separate window to search the prescribed order. Window graphics to show whether the DISTINCT clause is ON or OFF are also depicted in FIG. 2.

A subselect in a query can be displayed by name or icon as an element of a row condition predicate. Upon selection, the subquery would have its own primary window and associated clause windows in a direct graphical hierarchy. SET operations can be shown by individual objects in the query, including graphically depicted links between windows.

Though the invention has been described and illustrated by way of a specific embodiment, the methods, systems and programs encompassed by the invention should be interpreted consistent with the breadth of the claims set forth hereinafter.

What is claimed is:

1. A method for operating a database in a computer system to bidirectionally translate between graphical and text format representations of a database query, comprising the steps of:
   generating in the system a first data structure including a first link, which first data structure relates to a graphical format query;
   generating in the system a second data structure including a second link, which second data structure relates to a text format query; and
   bidirectionally translating between graphical format and text format queries using the first and second links.

2. The method recited in claim 1, wherein the bidirectional translation is accomplished so that the graphical and the text formats are functionally equivalent queries.

3. The method recited in claim 2, wherein the data structures are comprised of relational lists.

4. The method recited in claim 3, wherein the data structures define Boolean operators.

5. The method recited in claim 4, wherein the database is relational and the text format query uses a structured query language.

6. The method recited in claim 5, wherein the graphical format query is depicted on a video display screen using windows for one or more query clause relationships.

7. The method recited in claim 5, wherein one or more clauses of the database query uses a WHERE or HAVING clause.

8. The method recited in claim 6, wherein one or more clauses of the database query uses a WHERE or HAVING clause.

9. A computer system for bidirectionally translating between graphical and text format representations of a database query, comprising:
   a video display for depicting a database query in graphical or text formats;
   means for a user of the system to define a database query expression in graphical or text format through a physical interaction between the user and the system;
   means for creating a first data structure, including a first link, which relates to a graphical format query, responsive to the means for a user of the system to define;
   means for creating a second data structure, including a second link, which relates to a text format query, responsive to the means for a user of the system to define;

means for bidirectionally translating between graphical format and text format queries using the first and second links; and means for the video display to depict the database query defined by the user in a user selected format.

10. The system recited in claim 9, wherein the means for bidirectionally translating provides that the graphical and the text formats are functionally equivalent queries.

11. The system recited in claim 10, wherein the database is relational and the text format query uses structured query language.

12. The system recited in claim 11, wherein the graphical format query uses windows to depict one or more query clause relationships on the video display.

13. The system recited in claim 11, wherein one or more clauses in the database query uses a WHERE or HAVING clause.

14. The system recited in claim 12, wherein one or more clauses in the database query uses a WHERE or HAVING clause.

* * * * *